(12) United States Patent
Jackson et al.

(10) Patent No.: US 6,712,875 B1
(45) Date of Patent: Mar. 30, 2004

(54) METHOD AND APPARATUS FOR OPTIMIZED MIXING IN A COMMON HEARTH IN PLASMA FURNACE

(75) Inventors: Edward Scott Jackson, Steamboat Springs, CO (US); David O. Warren, Cloverdale, CA (US)

(73) Assignee: Lectrotherm, Inc., N. Canton, OH (US)

( * ) Notice: Subject to any disclaimer, the term of this patent is extended or adjusted under 35 U.S.C. 154(b) by 0 days.

(21) Appl. No.: 10/251,028

(22) Filed: Sep. 20, 2002

(51) Int. Cl.$^7$ ................................................ C21B 9/21
(52) U.S. Cl. .................. 75/414; 75/10.19; 75/612; 164/495; 164/514; 266/200; 373/21
(58) Field of Search ................ 75/10.19, 414, 75/612; 266/200; 164/495, 514; 373/21

(56) References Cited

U.S. PATENT DOCUMENTS

| | | | | |
|---|---|---|---|---|
| 4,794,979 A | * | 1/1989 | Gassner et al. | ............. 164/495 |
| 5,311,655 A | * | 5/1994 | Jager et al. | ................. 29/526.3 |

\* cited by examiner

Primary Examiner—Melvyn Andrews
(74) Attorney, Agent, or Firm—Sand & Sebolt

(57) ABSTRACT

A method and apparatus for optimized mixing in a common hearth in a plasma furnace. The apparatus provides a main hearth, a plurality of optional refining hearths, and a plurality of casting molds or direct molds whereby the refining hearths and molds define at least two separate ingot making lines. A feed chute provides raw material to the main hearth, whereby the feed chute is moveable to optimize its position during operation of the main hearth. Most particularly, the feed chute is moveable to provide better mixing, minimize skull build-up, and optimally place it opposite the overflow in use.

18 Claims, 21 Drawing Sheets

METHOD AND APPARATUS FOR OPTIMIZED MIXING IN A COMMON HEARTH IN PLASMA FURNACE

BACKGROUND OF THE INVENTION

1. Technical Field

This invention relates to the melting of titanium or titanium alloys in a plasma cold hearth furnace. More particularly, this invention relates to a plasma cold hearth melting method and apparatus for providing a titanium ingot of commercial quality. Specifically, the invention is a method and apparatus for optimized mixing in a common hearth in a plasma furnace using one or more moveable chutes.

2. Background Information

For many decades, aircraft engines, naval watercraft hulls, high tech parts for machinery and other critical component users have used substantial amounts of titanium or titanium alloys or other high quality alloys in the engines, the hulls, and other critical areas or components. The quality, tolerances, reliability, purity, structural integrity and other factors of these parts are critical to the performance thereof, and as such have required very high quality, advanced materials such as ultra-pure titanium or titanium alloys.

For decades, titanium usage was only where critical to meet very high quality, tolerances, reliability, purity, structural integrity and other factors because of the high cost of the manufacturing process which was typically a vacuum arc re-melting (VAR) process. However, high density inclusions and hard alpha inclusions were still sometimes present presenting the risk of failure of the component—a risk that is to be avoided due to the nature of use of many titanium components such as in aircraft engines. High-density inclusions, also called HDIs, are particles of significantly higher density than titanium and are introduced through contamination of raw materials used for ingot production where these defects are commonly molybdenum, tantalum, tungsten, and tungsten carbide. Hard alpha defects are titanium particles or regions with high concentrations of the interstitial alpha stabilizers, such as nitrogen, oxygen, or carbon. Of these, the worst defects are usually high in nitrogen and generally result from titanium burning in the presence of oxygen such as atmospheric air during production. It is well known in the industry that the VAR process, even with the inclusion of premelt procedural requirements and post-production nondestructive test (NDT) inspections has proven unable to completely exclude hard alpha inclusions and has shown only a minimal capability for eliminating HDIs. Since both types of defects are difficult to detect, it is desirable to use an improved or different manufacturing process.

In more recent years, the addition of cold hearth or "skull" melting as an initial refining step in an alloy refining process has been extremely successful in eliminating the occurrence of HDI inclusions without the additional raw material inspection steps necessary in a VAR process. The cold hearth melting process has also shown promise in eliminating hard alpha inclusions. However, in many applications the plasma cold hearth-melting step is followed by a final VAR process since it provides known results. This is detrimental however as it risks reintroducing inclusions or impurities into the ingot. It is clear that a cold hearth melt only process would be more economical as a source for pure titanium than a VAR process or a hearth melting and VAR combination process.

The cold hearth melting processes currently being used incorporate either plasma or electron beam (EB) energy. It has been discovered that the cold hearth melt process is superior to VAR melting since the molten metal must continuously travel through a water cooled hearth before passing into the ingot mold. Specifically, separation of the melting and casting zones produces a more controlled molten metal residence time which leads to better elimination of inclusions by mechanisms such as dissolution and density separation.

However, additional improvements are needed to reach the ultimate potential that cold hearth melting using plasma or electron beam energy has to offer. Numerous issues still exist that result in a lack of optimization of the cold hearth melt process.

In electron beam cold hearth melting, a sophisticated and expensive "hard" vacuum (a vacuum at $10-6^{th}$ millibars) system is still critical since electron beam energy guns will not operate reliably under any atmosphere other than a "hard" or "deep" vacuum. This vacuum also far exceeds the vapor pressure point of aluminum, which is often an element in titanium alloys. As a result evaporation of elemental aluminum results in potential alloy inconsistency and furnace interior sidewall contamination. Often sophisticated modeling and very thorough and costly scrap preparation are necessary due to the aluminum evaporation, as well as the addition of master alloys to make up for alloy evaporation losses. It is known that significant guesswork is often involved in making this process work.

In both plasma and electron beam cold hearth melting, many stirring and mixing inefficiencies exist. It is known that the more vigorous the stirring in a melting hearth the faster high melting point alloy additions go into solution, that a good homogeneous mixture requires enough stirring to reduce the potential for alloy segregation and that vigorous stirring insures against temperature variations in the melt hearth. It is also known that these temperature variations can make it difficult to reach a useful superheat.

The removal of high-density inclusions and hard alpha inclusions in a plasma and electron beam cold hearth melting process is also challenging. In operation, the residence time in the bath and a certain level of bath agitation resulting from the heat source are counted upon to "sink" the HDIs to the "mushy" zone at the bottom and "breakup" the LDIs to non-detectable levels. Experience has shown this to be an effective method of removing inclusions, however the process is certainly far from perfect and failure to remove the inclusions can be catastrophic.

Plasma and electron beam cold hearth melting are both continuous processes. From a practical standpoint, it is very difficult to sample the process as it occurs and therefore the results of the melt campaign are generally not known until the entire process is completed where product can be removed and physically sampled after cool-down. This has a number of associated drawbacks. First, it takes time before the plant knows whether the product is saleable. If the results are negative often the ingot is scrapped or must be cut up and re-melted again. Second, if the product can be salvaged it is usually downgraded and sold for less. Third, there are typically variations in chemistry throughout the product, which may be acceptable in an application but clearly point out the weakness in continuous operations of this nature. Even with good modeling capability the process is, at best, hit or miss. This is the primary reason most hearth melts require subsequent melting a second or third time in a conventional VAR furnace.

The continuous process also often does not yield a satisfactory surface finish. The result is the end user machining down the ingot prior to use. This is a large waste of resources—both in time and effort to machine the ingot, and in wasted titanium that is machined off into generally worthless titanium turnings or shavings.

It is thus very desirable to discover a method of re-using the inexpensive and readily available scrap or processed titanium turnings which have in the past been unusable in any quantity due to the high levels of surface oxygen contained therein as well as the potential and/or likelihood of molybdenum, tantalum, tungsten, and tungsten carbide contamination from machining with tool bits made of these materials.

BRIEF SUMMARY OF THE INVENTION

The invention is a method and apparatus for alternative pouring into molds, casts or refining hearths from a common hearth in a plasma furnace.

Specifically, the invention is an apparatus for alternative pouring of ingots, the apparatus includes a main hearth defining a melting cavity therein with a first and a second opposed overflows, a first and a second molds aligned respectively with the first and second overflow to be in fluid communication therewith, at least one torch overhead of the main hearth for selective heating of the contents of the main hearth, and at least one supplemental torch overhead of each of the molds for selectively heating of the contents of molds.

The method for alternating molten material pouring includes melting of the contents within a main hearth with a first and a second opposed overflows to define a molten material, pouring of molten material from the main hearth into a first mold adjacent a first end of the main hearth to define a first molded body, and pouring of molten material from the main hearth into a second mold adjacent a second end of the main hearth to define a second molded body.

BRIEF DESCRIPTION OF THE SEVERAL VIEWS OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DETAILED DESCRIPTION OF THE INVENTION

The improved cold hearth melting system of the present invention is shown in three embodiments in the Figures although other embodiments are contemplated as is apparent from the alternative design discussions herein and to one of skill in the art. Specifically, the first embodiment of the cold hearth melting system is indicated generally at 20 as shown in FIGS. 1–14. This cold hearth melting system 20 includes one or more feeders 22, a furnace 24, and one or more lift systems 26. In the version of the first embodiment shown in FIG. 1, the system 20 includes a pair of feeders 22A and 22B feeding metal (such as titanium, stainless steel, nickel, tungsten, molybdenum, niobium, zirconium, tantalum and, other metals or alloys thereof) into furnace 24 which processes the materials into ingots that are removed from the furnace by a pair of lift systems 26A and 26B. In the description below, only feeder 22A and lift system 26A are described in detail as to construction since the other is an identical or mirrored duplicate.

Figure 3:
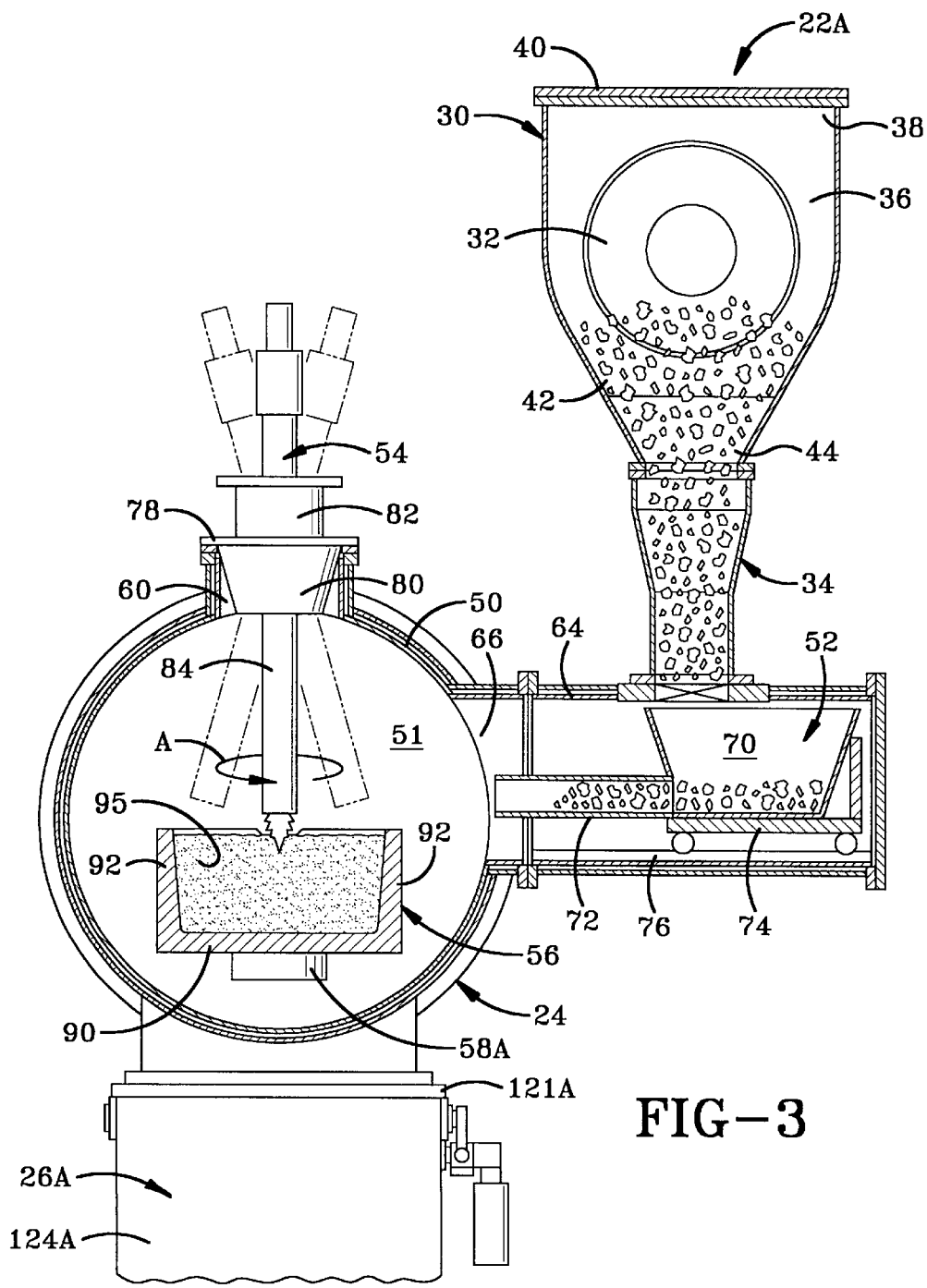
FIG. 3 is an enlarged side sectional view of the feeder and furnace portions of the cold hearth melting system as shown in FIG. 1 taken along line 3—3 with covers removed where the valve in the feeder is closed.
Figure 3A:
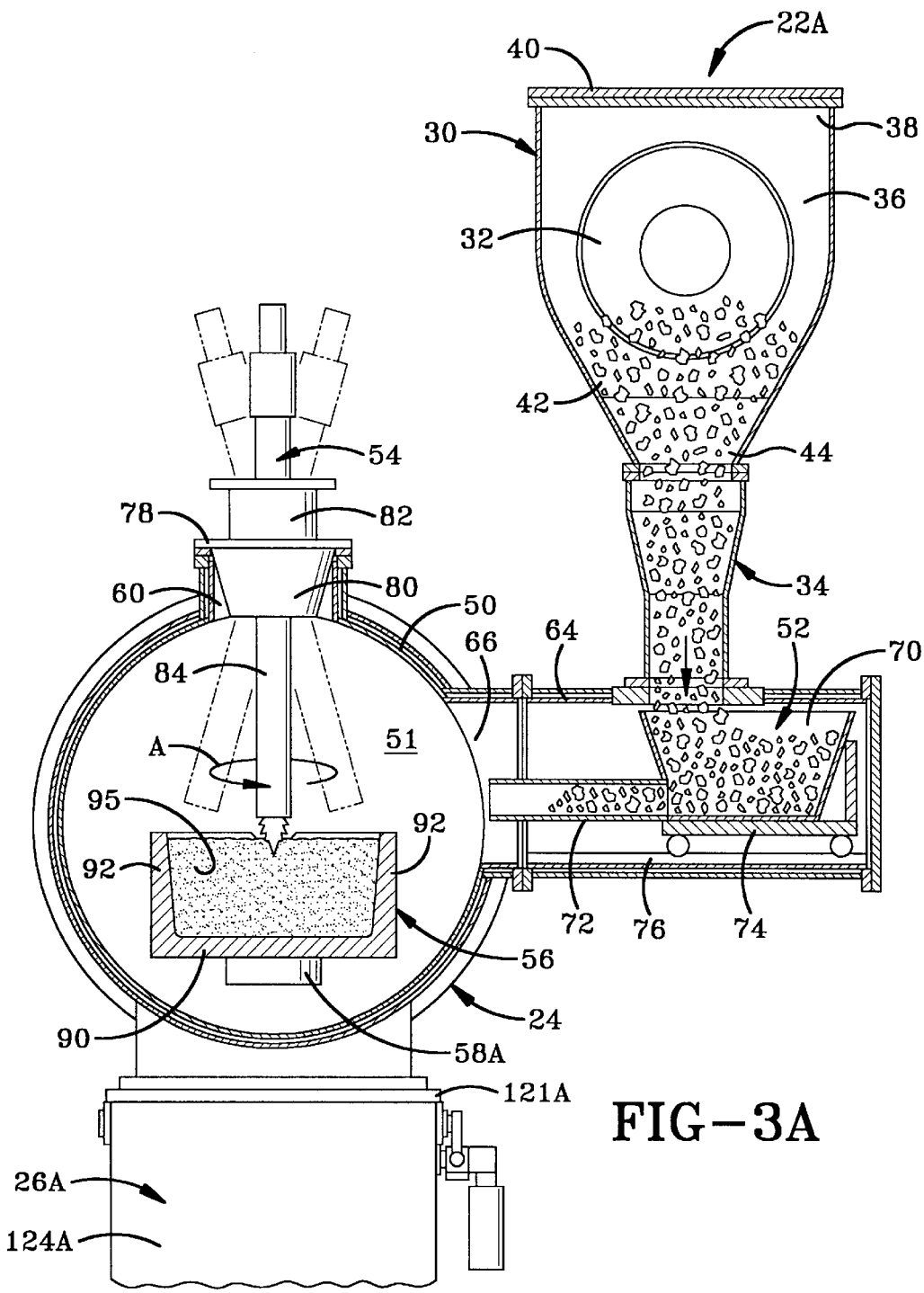
FIG. 3A is the same enlarged side sectional view of the feeder and furnace portions of the cold hearth melting system as shown in FIG. 3 except the valve in the feeder is open.

In more detail as shown in. FIG. 3, feeder 22A includes a hopper 30 with a rotary mixer 32 therein, and an optional chute 34 affixed thereto. Hopper 30 is a bin with a large storage area 36 adjacent an open end 38 having a door 40 hinged thereto, and a funnel or reducing cross sectional area 42 opposite the door 40 that terminates in an outlet 44. The rotary mixer 32 rotates within the large storage area 36 where it functions to mix the materials as well as work the materials toward the funnel area 42 and into the outlet 44. The chute 34 is connected to the outlet 44 and functions as an extension, which may or may not have a further reduction in cross section or diameter. The chute feeds the material into the furnace 24.

Figure 1:
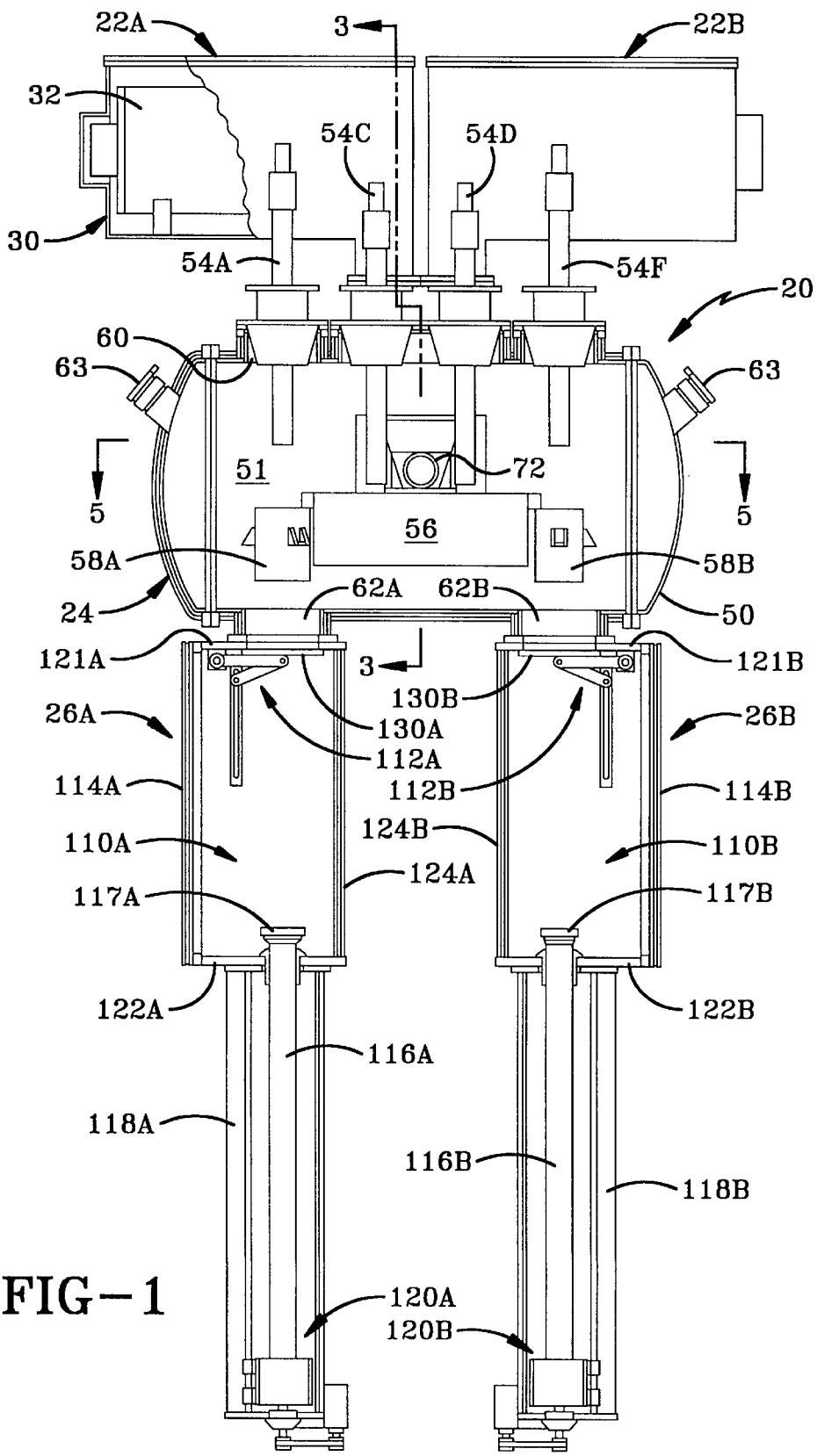
FIG. 1 is a front elevational view with covers removed and parts shown in section of a first embodiment of the cold hearth melting system of the present invention.

Furnace 24 is best shown in FIGS. 1 and 3 where it includes a housing 50 that defines a melting environment 51, a vibratory feed chute 52, a plurality of heat sources 54 (such as plasma torches or direct arc electrodes), a hearth 56, and one or more molds 58. Housing 50 is an outer shell defining an open furnace area in which the melting occurs in the hearth 56. Housing 50 may be of any shape and construction sufficient to provide the necessary atmosphere and space to perform hearth melting, and in the embodiment shown is of a cylindrical multi-walled construction with arcuate ends. In the embodiment shown in the FIGS., the housing 50 includes a plurality of heat source mount apertures 60 in a top side thereof, ingot removal ports 62 in the bottom side thereof, and one or more optional view windows 63 (in the embodiment shown in the arcuate ends of the housing although the windows may be positioned anywhere).

Figure 4:
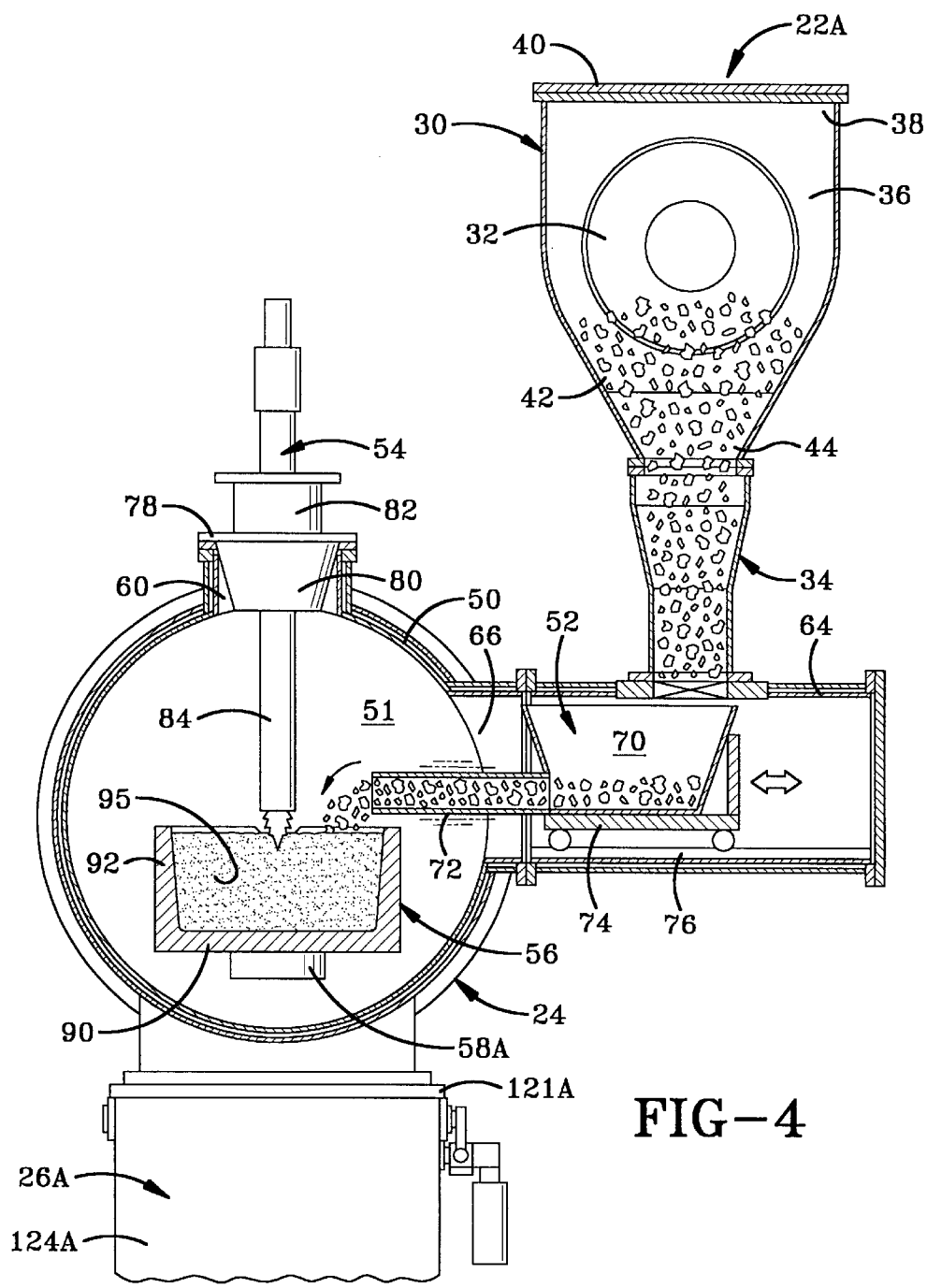
FIG. 4 is the same enlarged side sectional view of the feeder and furnace portions of the cold hearth melting system as shown in FIG. 3 or 3A except the valve in the feeder is closed and the car has been slid on the rail from a collecting only position to a collecting and discharging position.

As best shown in FIG. 3, the housing 50 also includes a feed chute extension 64 connected at passage 66 to the melting environment 51. The feed chute further including a feed port, preferably in a top surface of the extension where the feeders connect to the chute, where the feed port also includes one or more valves for controlling the flow of titanium chips into the feed chute 52 from the feeders 22. Feed chute 52 is movable within the feed chute extension 64 which extends transversely out from an opening in the housing 50, and is configured and designed to allow the feed chute 52 to traverse from wholly within the feed chute extension 64 as shown in FIG. 3 to partially in the feed chute extension and partially within the housing 50 adjacent to the hearth 56 as shown in FIG. 4 and described below in more detail. The feed chute 52 includes an open box or hopper 70 with a chute 72 extending therefrom, where the box 70 and chute 72 are positioned on a car 74 that rides on one or more rails 76 within the extension 64. The car is of an open top design like a hopper, and the feed port 66 is positioned such that it aligns over the open top design of the car 70 when the feed chute is fully retracted as shown in FIG. 3 as well as when fully extended as shown in FIG. 4 thereby assuring no spills of titanium chips and other raw materials within the feed chute.

The feed chute 52 is optimally vibratory to more readily eject the contents thereof via chute 72. The vibration acts to work the contents out of the chute.

Figure 5:
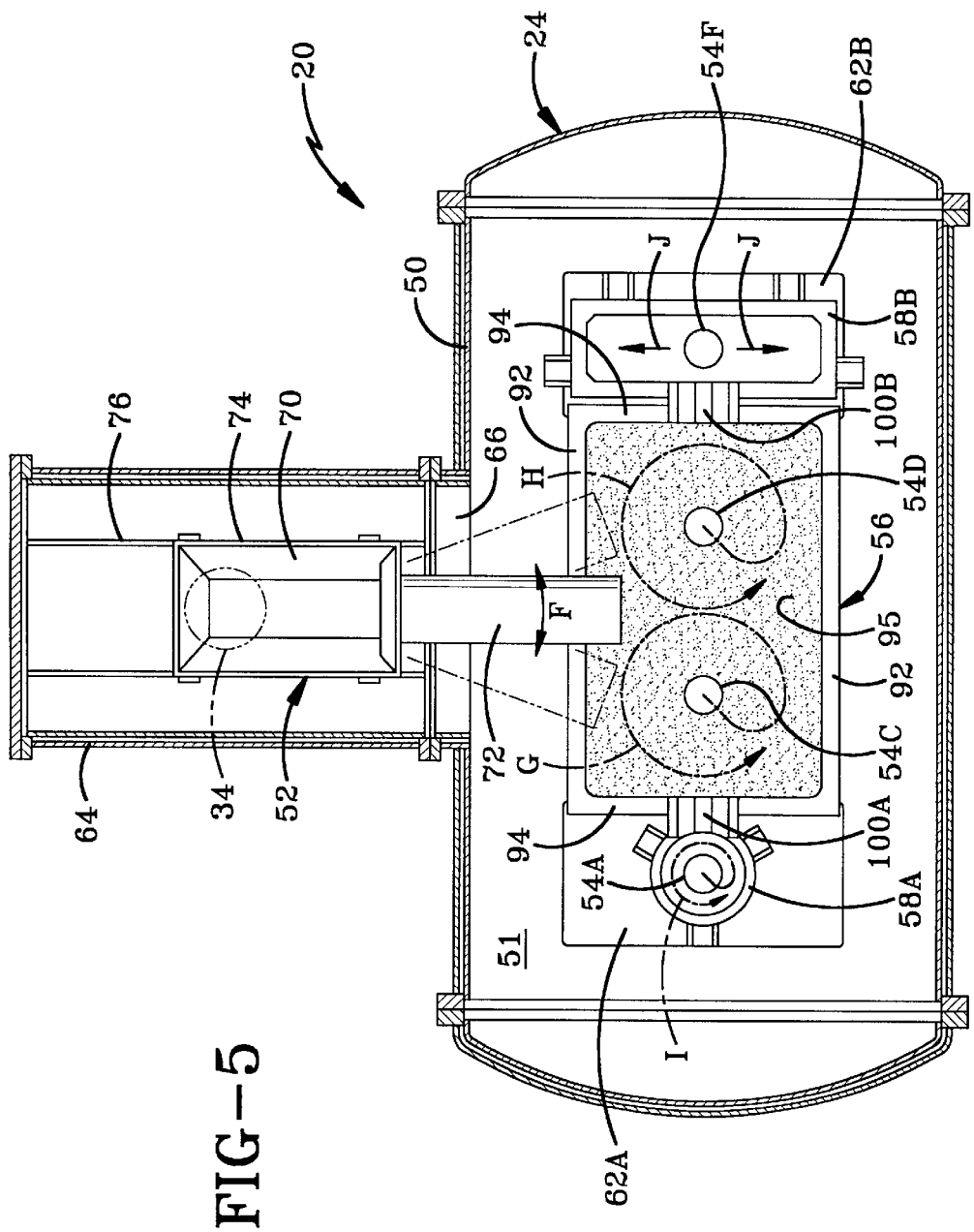
FIG. 5 is a top sectional view of the feeder and furnace taken along line 5—5 in FIG. 1 with covers removed.

The feed chute is further pivotable as best shown in FIG. 5 by arrow F. This allows the chute to be optimally positioned when over the hearth thereby allowing new material to be provided to the hearth in the most optimal position as described below in more detail.

Each of the plurality of heat source mount apertures 60 allows for a heat source to be positioned within the melting atmosphere or environment 51. As shown in FIG. 3, the heat source mount apertures include a seat 78 against which the heat source 54 is secured. Heat source 54 may be a plasma torch, direct arc electrode or any other heat source capable of providing sufficient controlled heat to melt titanium and other similar metals or alloys, and in the embodiment shown, four heat sources are provided as 54A, 54C, 54D, and 54F. The various heat sources are used based upon various positive attributes of each including broader plume provided by plasma torch which helps to better break up LDIs, versus with a direct arc electrode an ability to get desired surface finishes, optimal temperature controls, and avoid burning corner and melting crucible. In addition, plasma torch gives deeper and better stirring than the industry standard electron beam furnace, while the direct arc electrode gives the deepest and best stirring thereby providing improved metallurgical benefits, better homogeneity, and optimal HDI removal or spinning out due to optimal vortex action or centrifugal forces spinning HDIs into sludge area.

In the embodiment shown, the heat sources 54A, 54C, 54D, and 54F include a collar 80, a drive 82 and an elongated shaft 84. The elongated shaft 84 is driven by the drive 82 to move in a controlled manner in the collar 80 in both an axial direction (extending and retracting within the melting environment to be proximate or away from the hearth) and a pivotal or side to side direction (to pivot in a circular motion or move side to side in a linear motion). More specifically, the drive 82 drives the elongated shaft 84 in an axial direction so as to define a melt position where the heat source extends furthest into the furnace and most proximate the hearth as is shown in FIG. 3, and a withdrawn position where the heat source is withdrawn from proximity to the hearth when melting is not desired as shown and described later. In the embodiment shown, the drive 82 also pivots the elongated shaft 84 in a circular movement as shown in FIG. 3 by the arrow A. Alternatively, the motion may be limited to side to side linear motion if desirable due to the shape of the area being heated. In the embodiment shown, the heat source 54 is a plasma torch whereby a plasma arc is initiated from the lowermost end of the elongated shaft 84 that extends furthest into the furnace 24.

Also within the furnace 24 and proximate the lowermost end of the heat source when extended is the hearth 56. Hearth 56 is a primary melt hearth that is circular or elongated with rounded or egg-shaped interior dimensions making it appear similar to a bath tub shape whereby it includes a base 90 and a plurality of side walls 92 and end walls 94 defining an melting cavity 95. The hearth 56 is of a water-cooled copper design that is deeper than conventional furnace hearths. The heath is optimally a high conductivity, oxygen free (OFHC) hearth made of copper of a type 120 or 122.

In one embodiment, the hearth design is such that the vessel has higher than standard free board due to higher than standard side walls and thus is large enough for a four to six inch skull with two thousand to three thousand pound molten metal capacity and two or more heat sources. The melting hearth 56 is preferably mounted on a trunnion 96 to allow for tilt ranging from for instance fifteen degree back tilt to one hundred and five degree forward tilt thereby providing a vast array of casting possibilities. Tilting is better than standard overflow techniques as the user controls the flow and timing, and may allow the melting to occur as long as needed to assure LDIs and HDIs are removed or sunk. The user thus may control and monitor the "charging" of the molten material, while also avoiding the need for exact mixing as is required in continuous pouring since with tilting all materials may be poured in, mixed and heated for as long as is deemed necessary. In addition, the heat sources may be slightly decreased to cause the sunken HDIs to become sludge-like and not to be able to flow at all during tilting and/or overflow as described below.

The hearth includes a pair of overflows 100A and 100B as best shown in FIGS. 6–14. These overflows channel the molten titanium as it rises into one or more molds as described below based upon rising levels overflowing and/or tilting of the hearth to cause overflow to one side or the other. In the embodiment in FIGS. 1–14, a pair of molds 58A and 58B are shown. One mold 58A and 58B is one each side of the hearth and is respectively aligned with the overflows 100A and 100B. The molds may be either casting molds to shape the ingot as shown in FIGS. 1–14 where such shapes may be cylinders or slabs, or alternatively may be direct molds shaped identical to the end product. In the embodiment shown with the casting molds, the molds are generally of a cylindrical interior contour 110 with, an open top 112 and an open bottom 114. The open bottom of the molds 58A and 58B receives one of the lift systems 26A or 26B, respectively as described below.

In the base of the furnace 24 are the ingot removal ports 62A and 62B which align with the molds 58A and 58B and the lift systems 26A and 26B. The lift systems 26A and 26B attach to the ingot removal ports to provide for a system to lift direct molds into the melting environment (in contrast, casting molds are affixed in the melting environment) and remove them once filled, or in the case of casting molds to "catch" and remove the ingots as they form within the casting molds. The lift system 26A is best shown in FIGS. 1–2 and 6–14 to include an ingot removal chamber 110A with a chamber isolation valve gate mechanism 112A and ingot removal door 114A, an ingot removal cylinder 116A, a cylinder housing 118A, and a cylinder drive system 120A.

Ingot removal chamber 110A is an enlarged chamber aligned with the mold 58A such that the ingot as formed is lowered by the cylinder 116A into the chamber 110A as the cylinder is retracted by drive system 120A into housing 118A. In the embodiment shown, the chamber 110A is an elongated chamber with an upper end 120A, a lower end 122A, and one or more walls 124A therebetween with one wall including door 114A therein which is removable to remove a completed ingot from the system as described below.

Figure 4A:
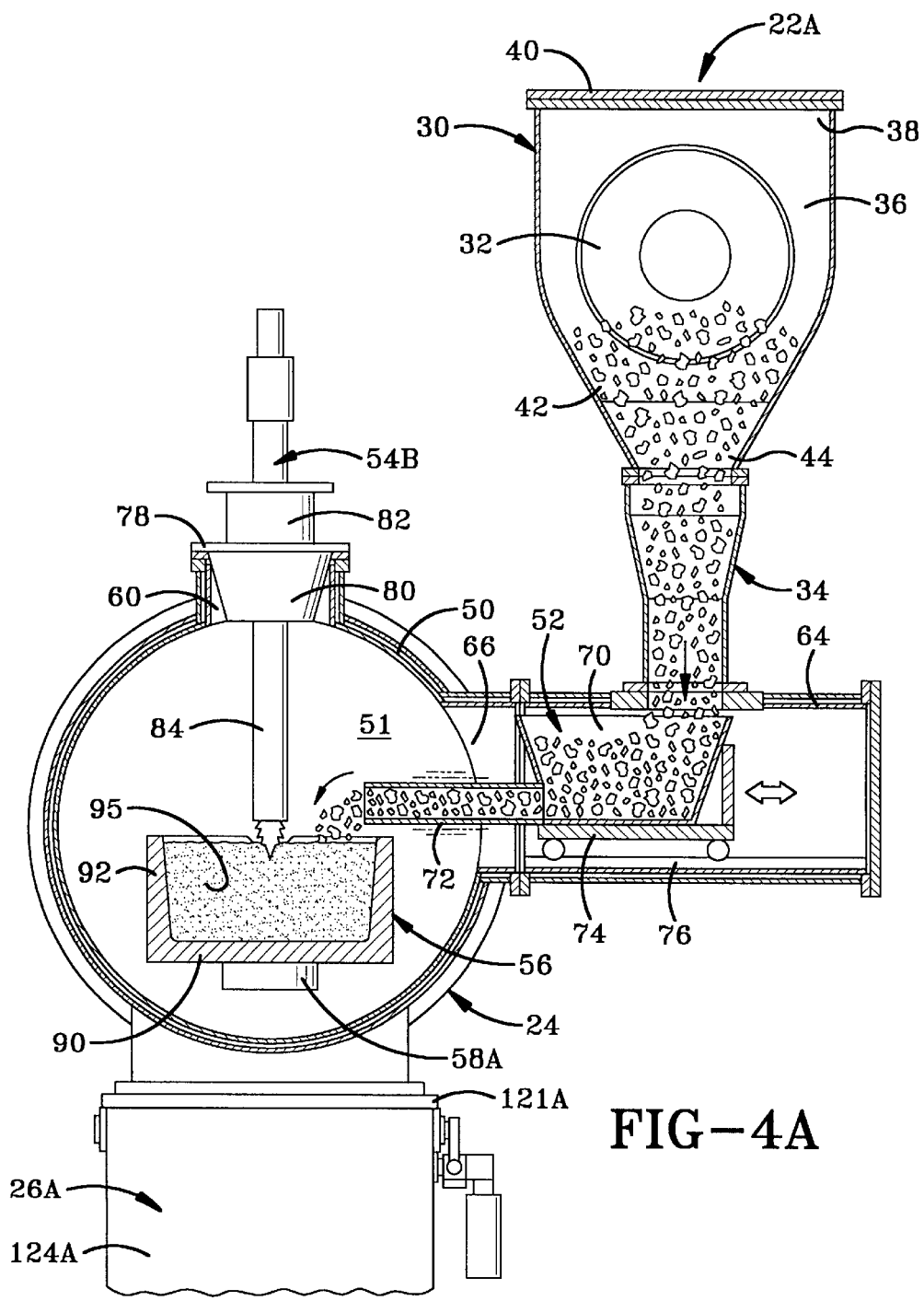
FIG. 4A is the same enlarged side sectional view of the feeder and furnace portions of the cold hearth melting system as shown in FIG. 4 except the valve in the feeder is open.

The chamber isolation valve gate mechanism 112A is positioned in upper end 120A and includes a door 130A embodied as an articulated flapper valve gate, a fixed pivot rod 132A, a first arm 134A, a movable pivot rod 136A, a second arm 138A, a fixed arm 140A with an elongated slot 142A therein, and a slidable pivot rod 144A. A drive mechanism on the exterior of the chamber is shown in FIGS. 3–4A. Fixed pivot rod 132A is pivotally connected to a first end of first arm 134A and the chamber 110A to allow the first arm 134A to pivot therefrom. Also connected to the first arm 134A is the valve gate 130A. A second end of first arm 134A and a first end of second arm 138A are pivotally connected by movable pivot rod 136A. A second end of the second arm 138A is slidably connected in slot 142A of fixed arm 140A by slidable pivot rod 144A. Slidable pivot rod 144A is connectable to a drive device to allow for automatic opening and closing of the valve gate to correspond to insertion and removal of the cylinder 116A as needed to receive ingots as produced. The valve gate mechanism is designed such that it remains out of potential contact with the ingot.

Cylinder 116A slides through the chamber 110A from a fully extended position where the cylinder is fully extended from the housing 118A, through a bushing 146A in a cylinder port 148A, through the chamber 11A, through the ingot removal port 62 and into the melting environment 51 and specifically open bottom 114A, to a fully retracted position where the cylinder is fully retracted into the housing 118A whereby only the cylinder head 117A remains extended through bushing 146A in chamber 110A.

Figure 2:
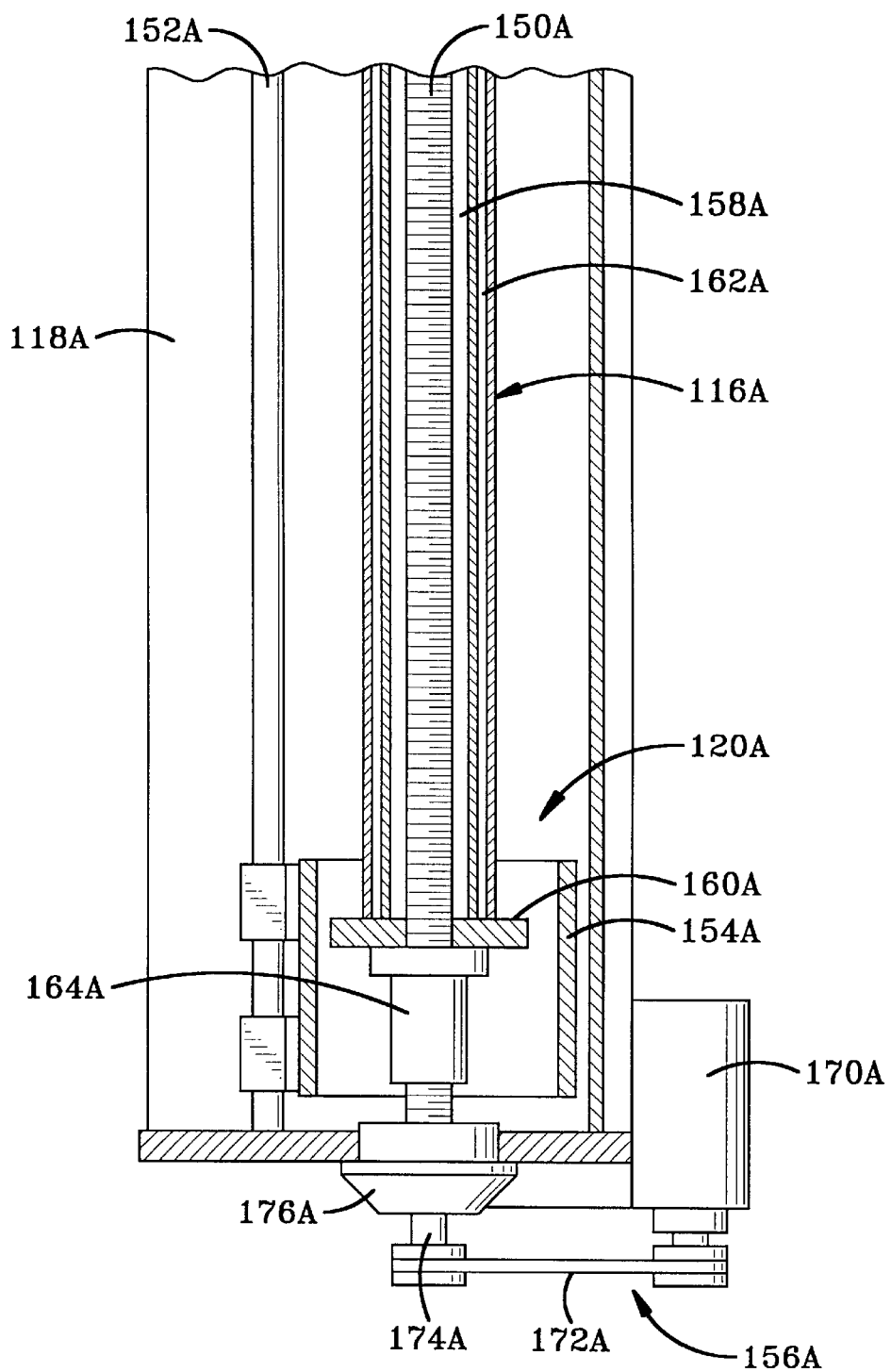
FIG. 2 is an enlarged front sectional view of the lift portion of the cold hearth melting system as shown in FIG. 1.

This movement of the cylinder 116A from a fully retracted to a fully extended position, and back, is accomplished by drive system 120A. Drive system 120A as best shown in FIG. 2 includes a threaded drive rod 150A, a guide rod 152A, a trolley or follower 154A and a drive mechanism 156A, all of which is supported by housing 118A. Cylinder 116A includes an elongated, axial passageway 158A that is threaded at least at each end via a guide plate 160A to mate with the threaded drive rod 150A, and may further include a coolant passage 162A therein also. A threaded stop 164A threaded onto the drive rod 150A supports the cylinder 116A and interacts with the trolley 154A as the drive rod 150A is turned to cause axial motion of the cylinder 116A along the drive rod whereby the trolley is slidably coupled to the guide rod 150A assuring a smooth axial motion. Drive mechanism 156A includes a drive motor or like device 170A connected to a drive arm 172A that is connected to a non-threaded end 174A of the threaded drive rod 150A extending out of the housing 118A via a bushing 176A. The drive motor 160A imparts motion to the arm 162A, which in turn imparts motion to the rod 150A in a manner well known to those of skill in the art.

Figure 6:
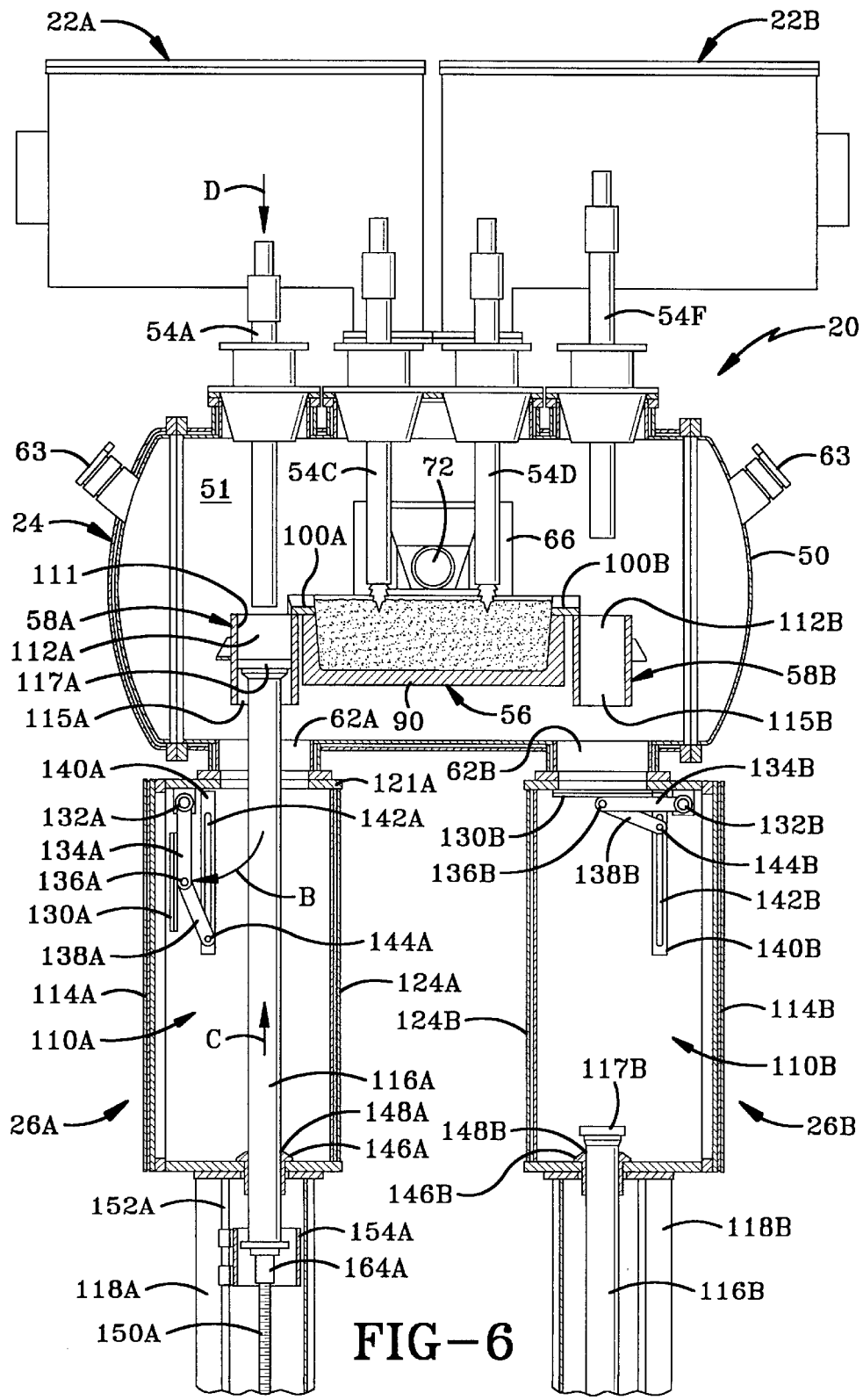
FIG. 6 is an operational view of the cold hearth melting system of FIG. 1 where the torch associated with the left side casting mold is moved into ignition position, and the left side flap is open and left, side ingot receiving cylinder is inserted therethrough and positioned to receive a new ingot.

Having above described the system, the method of using the system will now be described as is best shown in FIGS. 6–14. When it is desirable to make elongated ingots this system is employed whereby heat sources 54C and 54D are lowered to proper positions above the hearth 56 as shown in FIG. 6 whereby this is accomplished by drive 82 lowering elongated shaft 84 within collar 80, and then igniting the lowermost or ignition point of each shaft 84 as shown to provide heat to the interior of the hearth 56 to melt the titanium and alloys therein as well as any added by chute 72 (none being added at this time in the embodiment shown in FIG. 6).

The heat sources 54A and 54F are provided as supplemental heat in this hot top process to control the solidification rate and refine the grain structure. These heat sources also prevent piping, which is common in direct mold casting processes.

Once the titanium is sufficiently molten, ingots may be created on either the left and/or right sides of the system (ingot making may start on either side or on both simultaneously—in the case of the embodiment described and shown, the left side was chosen). As shown in FIG. 6, valve gate 130A (associated with the left side lift system) is opened by the motion shown by arrow B. Specifically, slidable pivot rod 144A is driven by user action or by a drive motor and linkage (shown in FIGS. 3–4A) to slide downward in the slot 142A of arm 140A. This causes arm 138A to pull arm 134A about pivot rod 136A and pivot rod 132A such that the door 130A uncovers ingot removal port 62A and moves as shown by arrow B. Cylinder 116A is then actuated upward as shown by arrow C from its fully retracted position to its fully extended position as shown in FIG. 6 by drive 156A threadably moving trolley 154A up the threaded shaft 150A causing cylinder 116A to be forced upward. Heat source 54A is lowered into position as shown by arrow D.

Figure 7:
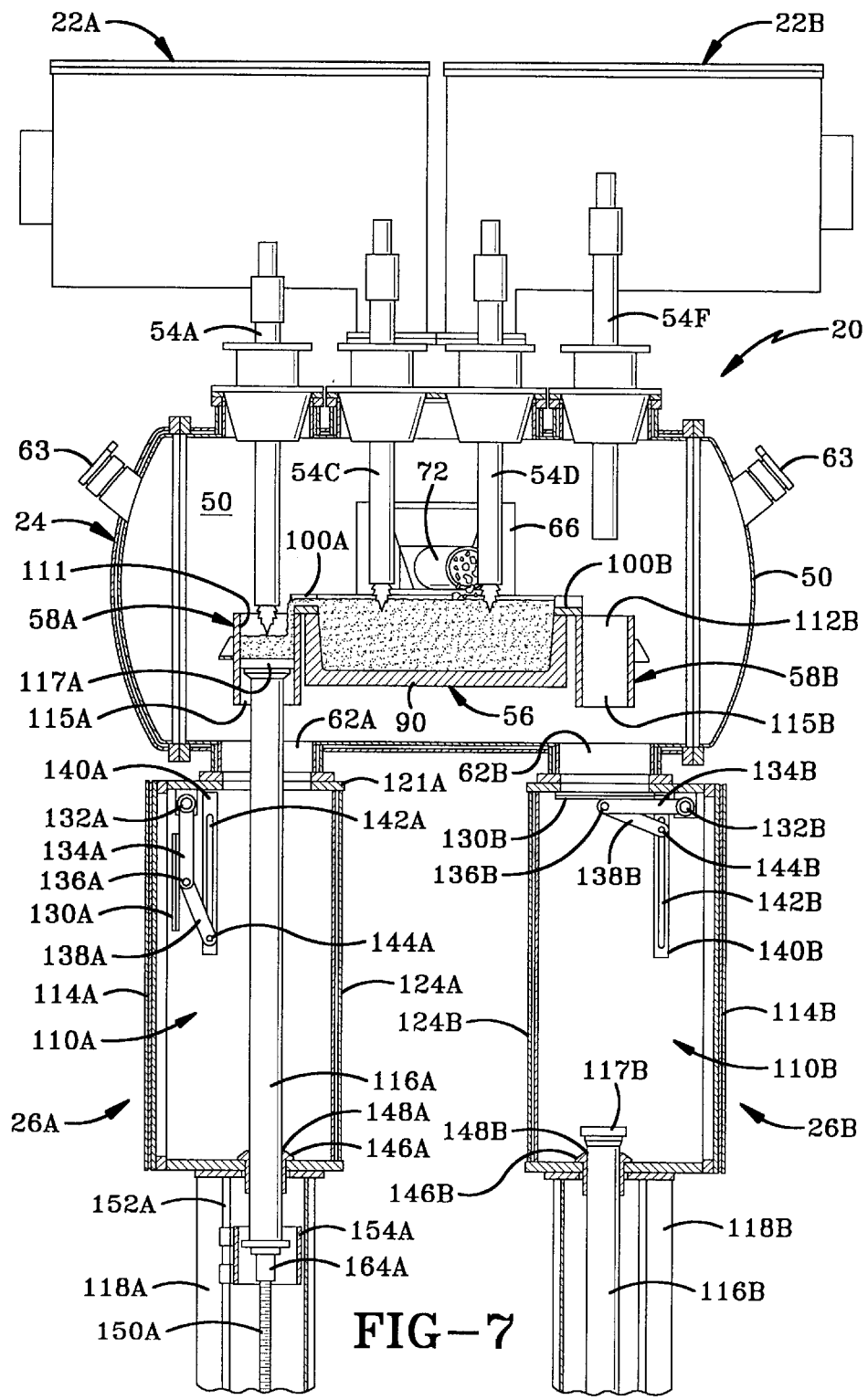
FIG. 7 is an operational view similar to FIG. 6 except that the torch associated with the left side casting mold is, ignited to cause flow as is needed to create a new ingot.
Figure 8:
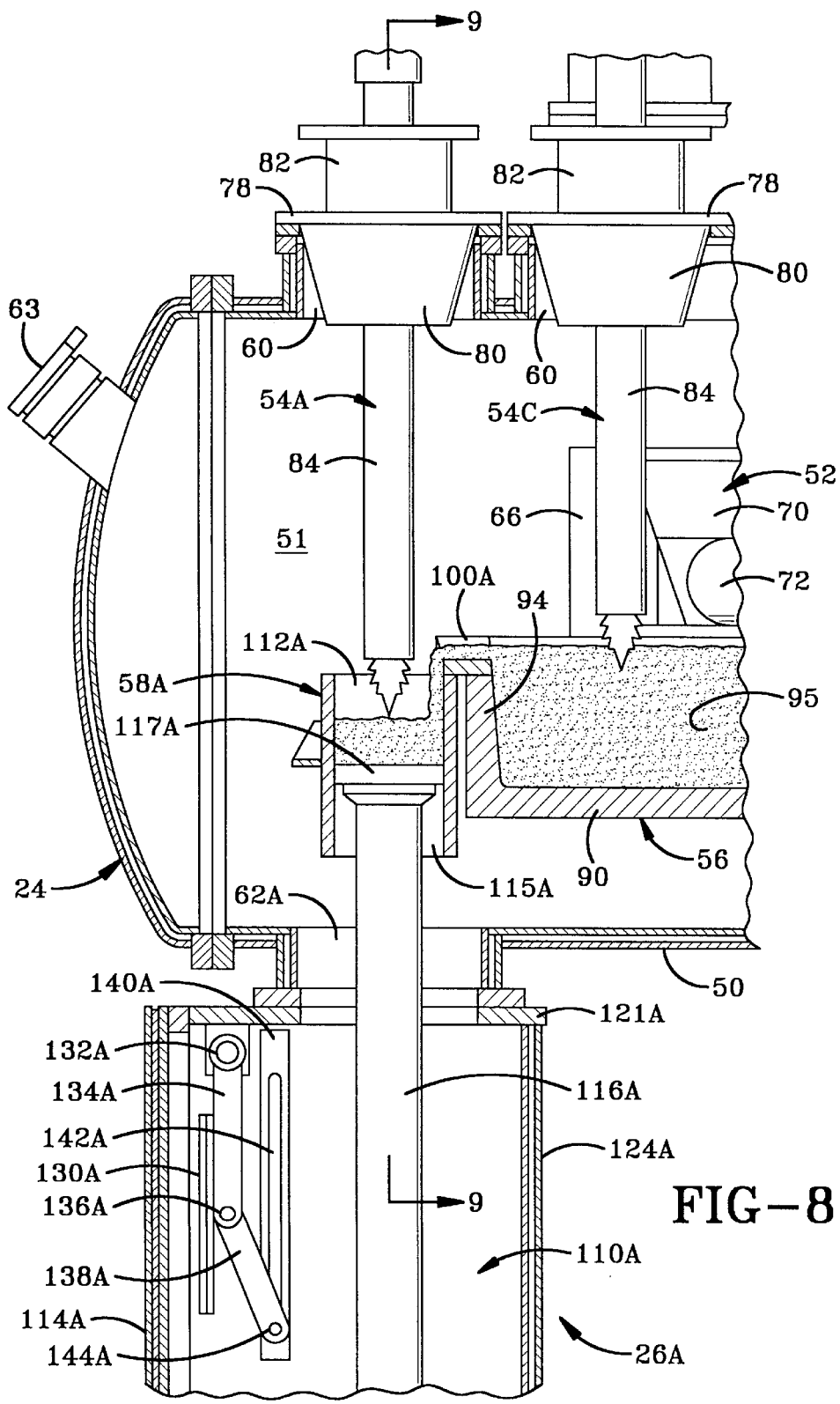
FIG. 8 is an enlarged view of the left side torch, left side casting mold and left side cylinder portions of the furnace as shown in FIG. 7.

The system is now ready on its left side to produce ingots. Once the titanium and alloy in the hearth 56 are sufficiently heated to produce molten titanium, the ingot producing process may begin. As shown in FIG. 7, heat source 54A is ignited thereby creating a liquid flow through overflow 100A and causing the titanium in overflow 100A to flow out; This flow pours molten titanium into casting mold 58A whereby the ingot begins forming therein between the cylinder head 117A and the mold casting interior. Cylinder 116A is slowly withdrawn as shown by arrow E in FIG. 7 as additional molten material is added and the elongated ingot forms (this is shown by the transition from FIG. 7 to FIG. 10).

Figure 9:
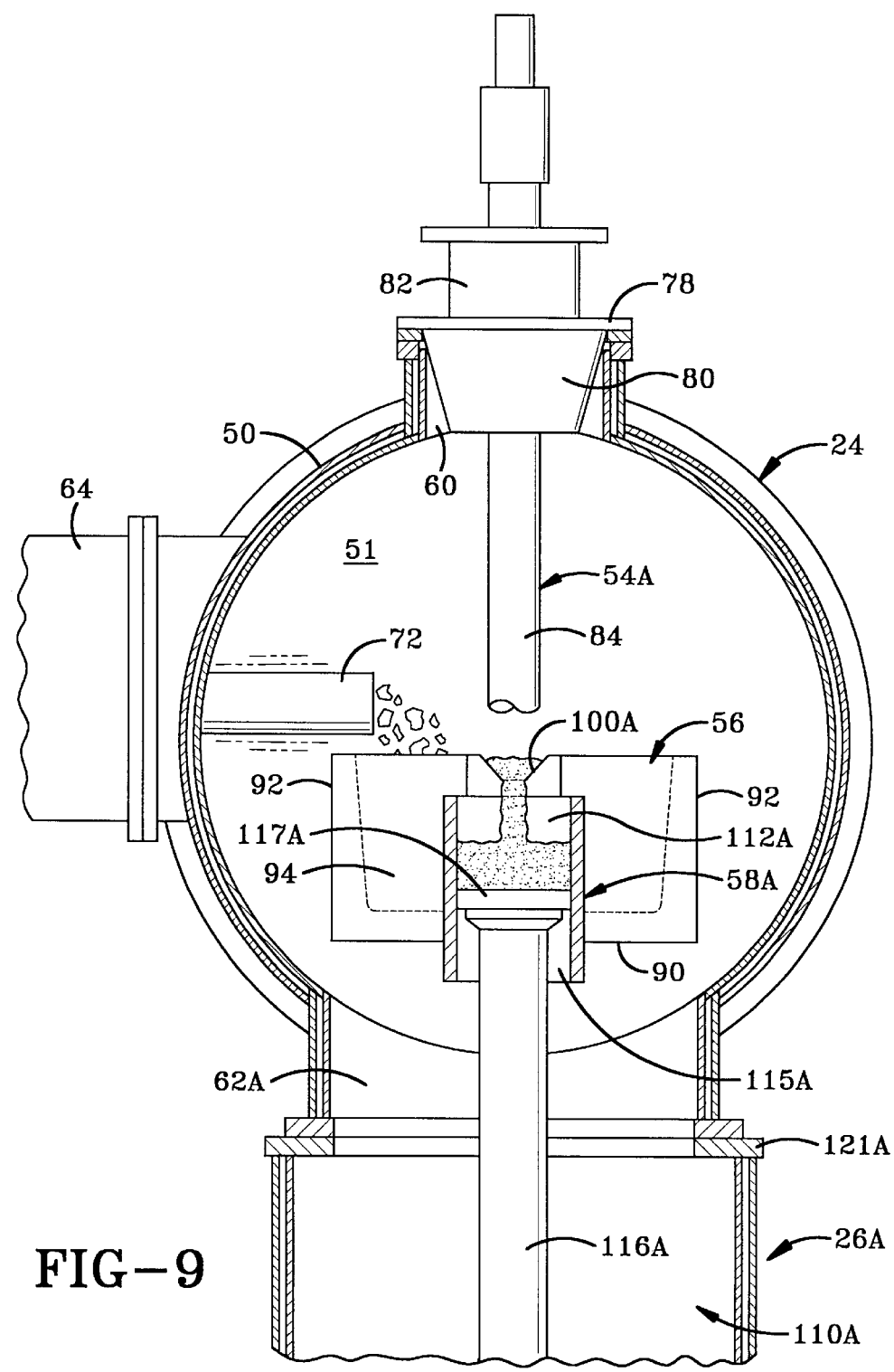
FIG. 9 is an end sectional view of the left side torch, left side casting mold and left side cylinder portions of the furnace taken along line 9—9 in FIG. 8.
Figure 10:
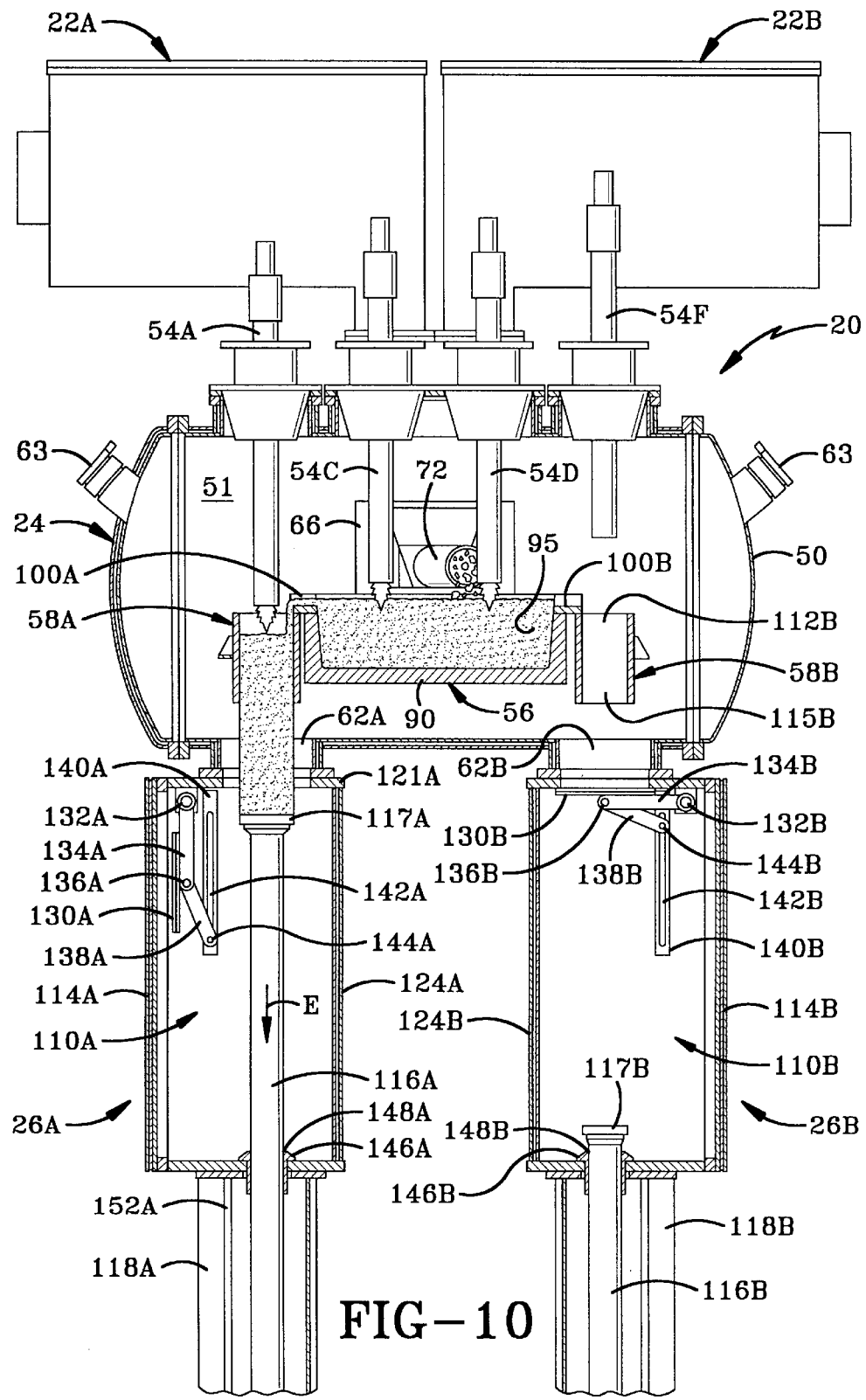
FIG. 10 is an operational view similar to FIGS. 6 and 7 except that the torch associated with the left side casting mold has been ignited for a sufficient time period to cause flow resulting in the creation of the new ingot as the cylinder is withdrawn from the furnace into the lift portion of the system.

During the ingot creating process of FIGS. 7 and 10, additional titanium and other alloy chips may be added as shown by chute 72. Chute 72 is moved to its fully extended position. It is preferred that the entry of titanium and like chips be away from the active overflow, in this case 100A (this is shown in FIGS. 7 and 9 with the chute facing right). This is achieved by movement of the chute from side to side as best shown in FIG. 5 by arrow F to best position the chute away from the current open overflow.

In the most preferred embodiment, the heat sources 54C and 54D associated with the hearth are rotated as best shown in FIG. 5 by arrows G and H during the entire process, although alternatively the heat sources may be moved side to side or in any other desirable manner. In addition, the heat sources 54A and 54F may also rotated or moved side to side or otherwise moved to promote more even melting, and this is shown in FIG. 5 where heat source 54A rotates circularly as shown by arrow I and heat source 54F rotates side to side in a linear fashion as shown by arrows J.

A full ingot is eventually formed. The heat source 54A is shut off and withdrawn as shown by arrow K in FIG. 11. The cylinder 116A is fully withdrawn as shown by arrow L such that the ingot is fully within chamber 11A. In no particular order, valve gate 130A is closed and door 114A is opened. In addition, the chute is moved to a center position (rather than right position) and flow is stopped. The chute 72 may also be withdrawn to a fully retracted position.

Figure 11:
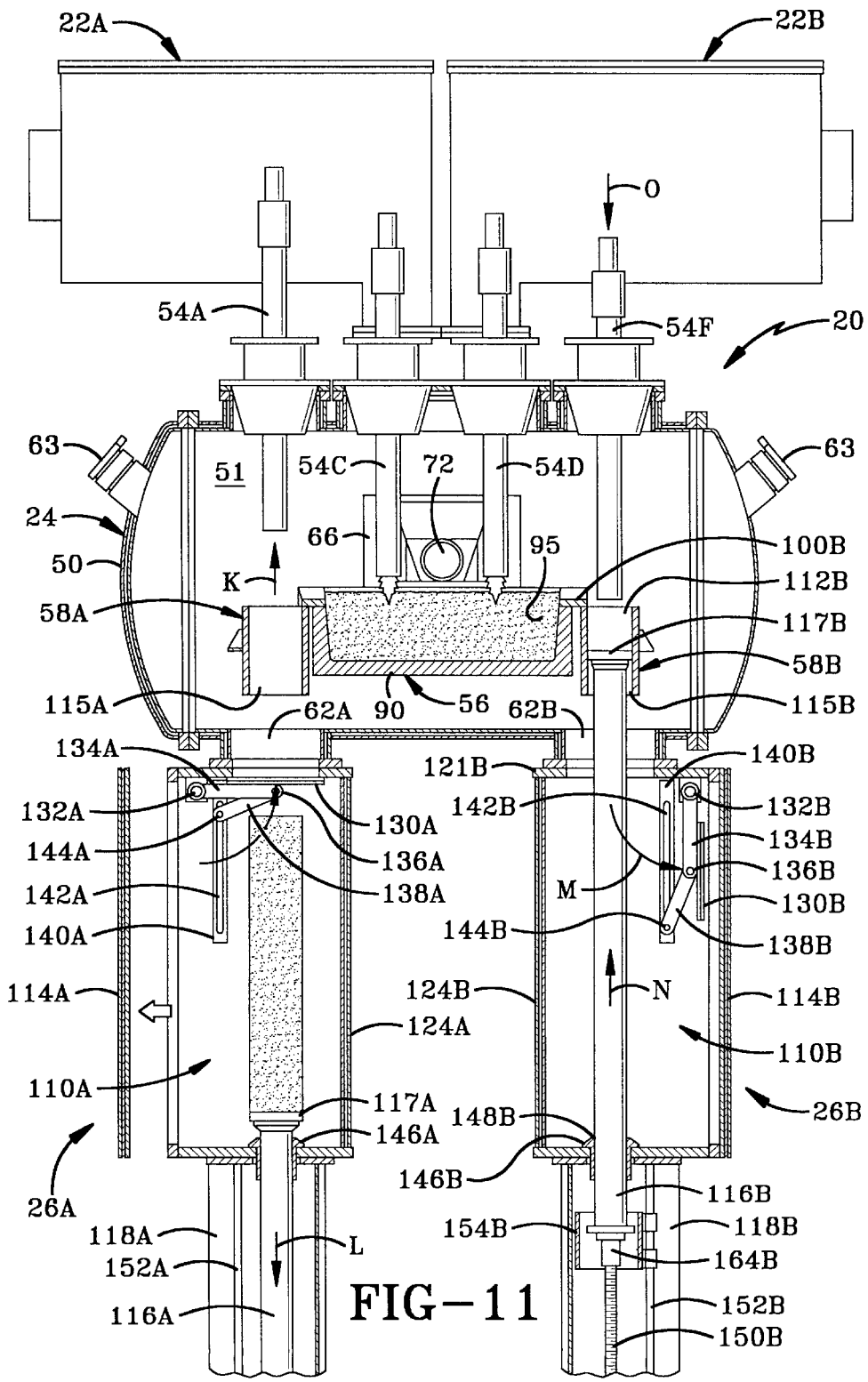
FIG. 11 is an operational view similar to FIG. 10 except that the torch associated with the left side casting mold has been shut off and removed, and the left side cylinder has been removed from the furnace with the new ingot thereon such that the left side flap is closed while the left side ingot removal door is open, and simultaneously therewith the torch associated with the right side casting mold is moved into ignition position, and the right side flap is open and right side ingot receiving cylinder is inserted therethrough and positioned to receive a new ingot.

Simultaneously therewith, or slightly before or after, valve gate 130B (associated with the right side lift system) is opened by the motion shown by arrow M in the same manner as described above for valve gate 130B on the left side. Cylinder 116B on the right side is then actuated upward as shown by arrow N from its fully retracted position to its fully extended position as shown in FIG. 11 in the same manner as described above for the left side cylinder. Heat source 54F is lowered into position as shown by arrow O.

The system setup is thus such that setup is occurring as to one lift system while an ingot is being produced in relation to the other lift system, and vice versa, such that continuous melting and ingot production may occur if desired. This is continued in FIG. 12 where an ingot is being removed from the left side, while the right side heat source 54F is ignited thereby causing the titanium in overflow 100B to flow. This flow pours molten titanium into casting mold 58B whereby the ingot begins to form therein between the cylinder head 117B and the mold casting interior. Cylinder 116B is slowly withdrawn as shown by arrow P in FIG. 13 as additional molten material is added and the elongated ingot forms (this is shown by the transition from FIG. 12 to FIG. 13).

Figure 12:
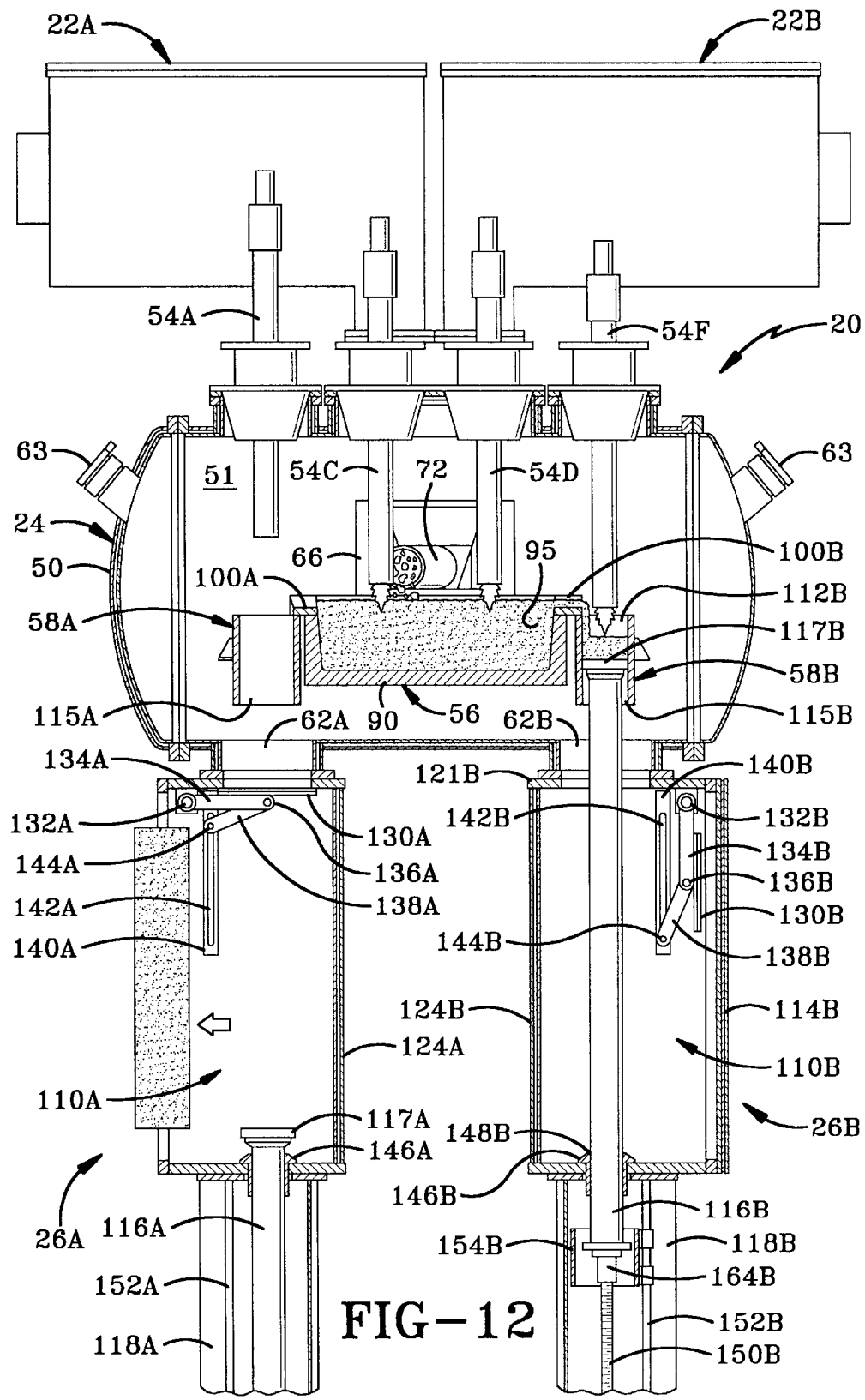
FIG. 12 is an operational view similar to FIG. 11 except that the new ingot is being removed form the left side while simultaneous therewith the torch associated with the right side casting mold is ignited to cause flow as is needed to create a new ingot.
Figure 13:
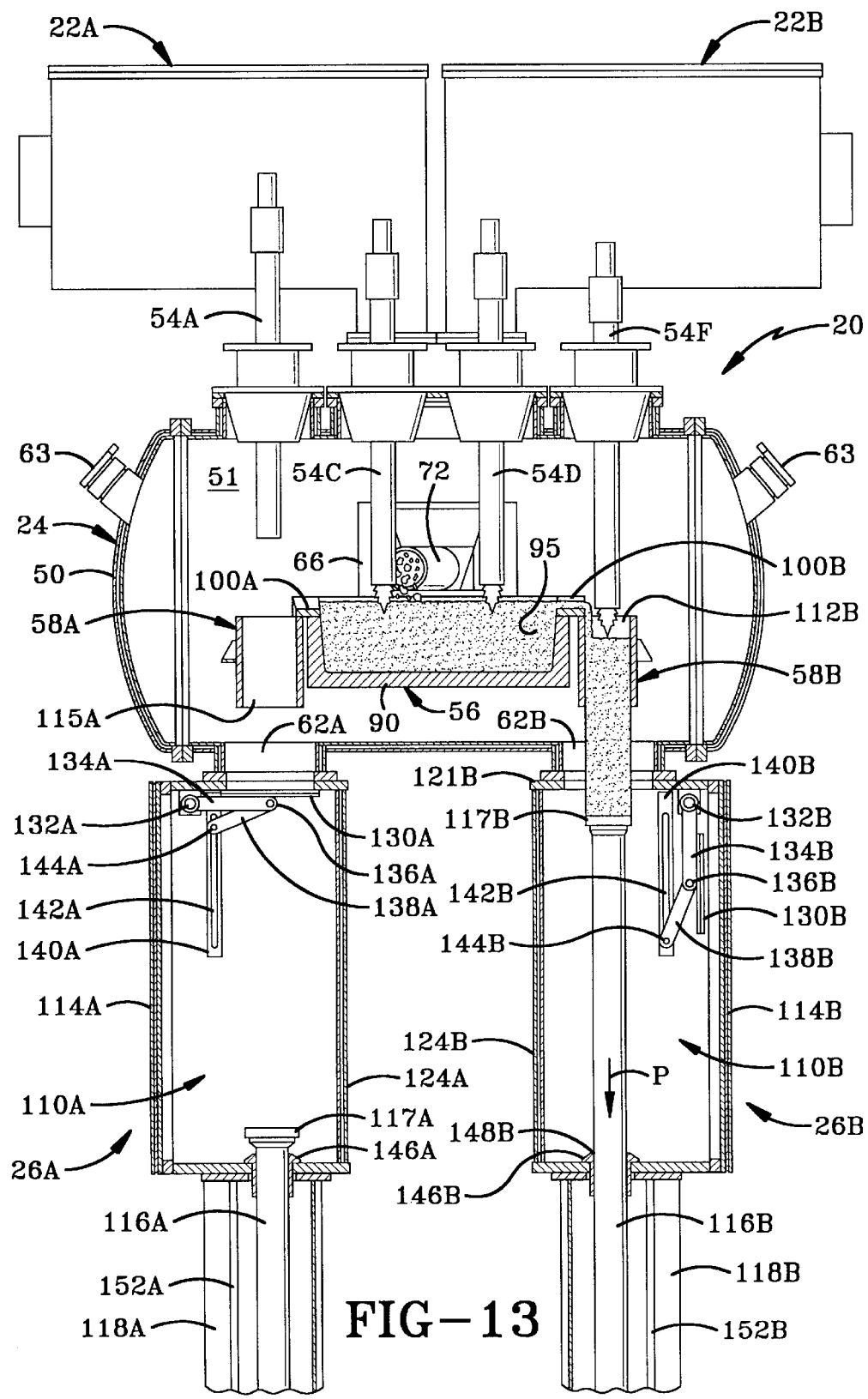
FIG. 13 is an operational view similar to FIG. 12 except that the torch associated with the right side casting mold has been ignited for a sufficient time period to cause flow resulting in the creation of the new ingot as the cylinder is withdrawn from the furnace into the lift portion of the system.

Again, during the ingot creating process of FIGS. 12 and 13, additional titanium and other alloy chips may be added as shown by chute 72. It is preferred that the entry be away from the overflow 100B that is active (this is shown in FIGS. 12 and 13 with the chute facing left). This is achieved by movement of the chute from side to side as best shown in FIG. 5 by arrow F to best position the chute away from the current open overflow.

A full ingot is eventually formed. The heat source 54F is shut off and withdrawn as shown by arrow Q in FIG. 14. The cylinder 116B is fully withdrawn such that the ingot is fully within chamber 110B. In no particular order, valve gate 130B is closed as shown by arrow R and door 114B is opened. In addition, the chute is moved to a center position (rather than right position and may also be withdrawn to a fully retracted position) and flow is stopped. The ingot will then be removed.

Figure 14:
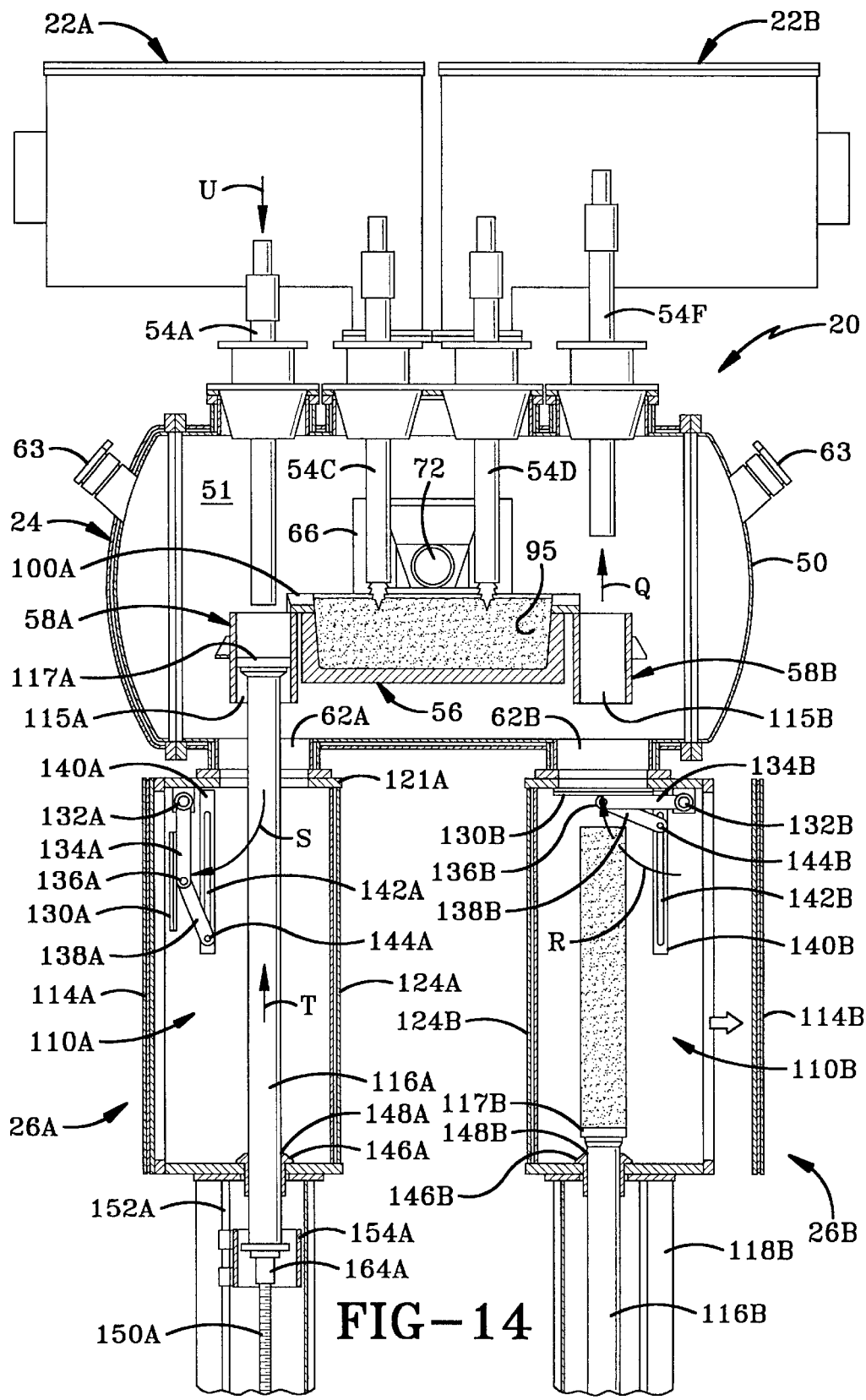
FIG. 14 is an operational view similar to FIG. 13 except that the torch associated with the right side casting mold has been shut off and removed, and the right side cylinder has been removed from the furnace with the new ingot thereon such that the right side flap is closed while the right side ingot removal door is open, and simultaneously therewith the torch associated with the left side casting mold is moved into ignition position, and the left side flap is open and left side ingot receiving cylinder is inserted therethrough and positioned to receive a new ingot.

Simultaneously therewith, or slightly before or after, where desired to continue making ingots, valve gate 130A is opened by the motion shown by arrow S in the same manner as described above. Cylinder 116A on the right side is then actuated upward as shown by arrow T from its fully retracted position to its fully extended position as shown in FIG. 14 in the same manner as described above. Heat source 54A is lowered into position as shown by arrow U. The process continues going back and forth as long as desired.

Alternatively, all four heat,sources 54A, 54C, 54D and 54F may be ignited to allow for flow out of both overflows 100A and 100B resulting in simultaneous ingot production in both molds 58A and 58B.

Further alternatively, pouring may, be induced by tilting of the hearth 56 in combination with ignition of the heat source adjacent to the mold, in the case of mold 58A that is heat source 54A. It is also contemplated that ignition of the heat source adjacent the mold may not be necessary to cause overflow during tilting or without tilting should the heat sources associated with the hearth be positioned so as to properly heat the overflow.

Figure 15:
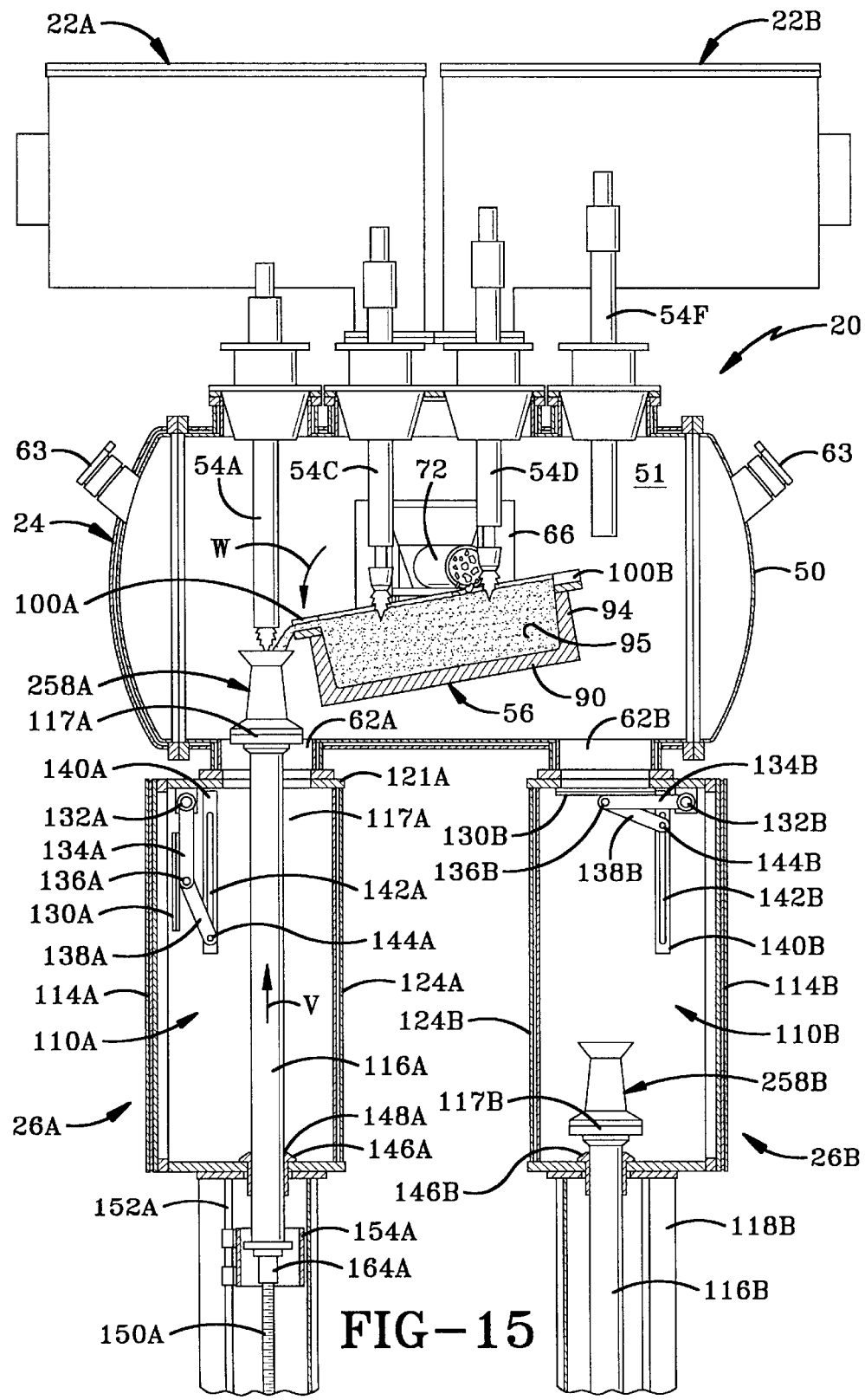
FIG. 15 is a front elevational view with covers removed and parts shown in section of a second embodiment of the cold hearth melting system of the present invention where the hearth pivots to pour into end product molds rather than ingot shaping passthrough molds as in the first embodiment, whereby in this embodiment the torches are ignited and move to cause pouring from the hearth into the desired left side mold in this view and the corresponding left side flap is open and left side mold seating cylinder is inserted therethrough and positioned to allow for proper pouring into the mold.
Figure 15A:
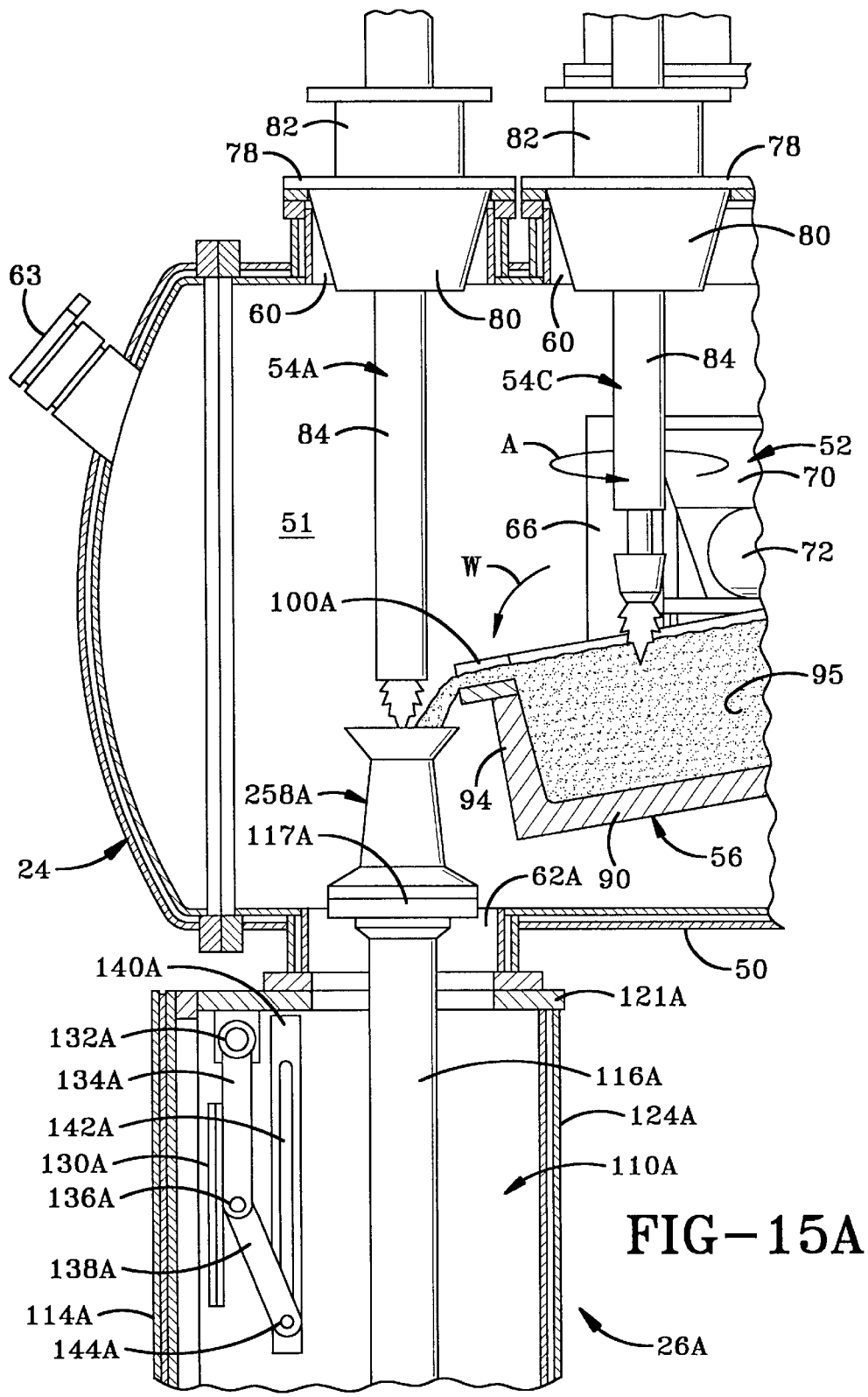
FIG. 15A is an enlarged view of the left side torch, left side mold and left side cylinder portions of the furnace as shown in FIG. 15.
Figure 16:
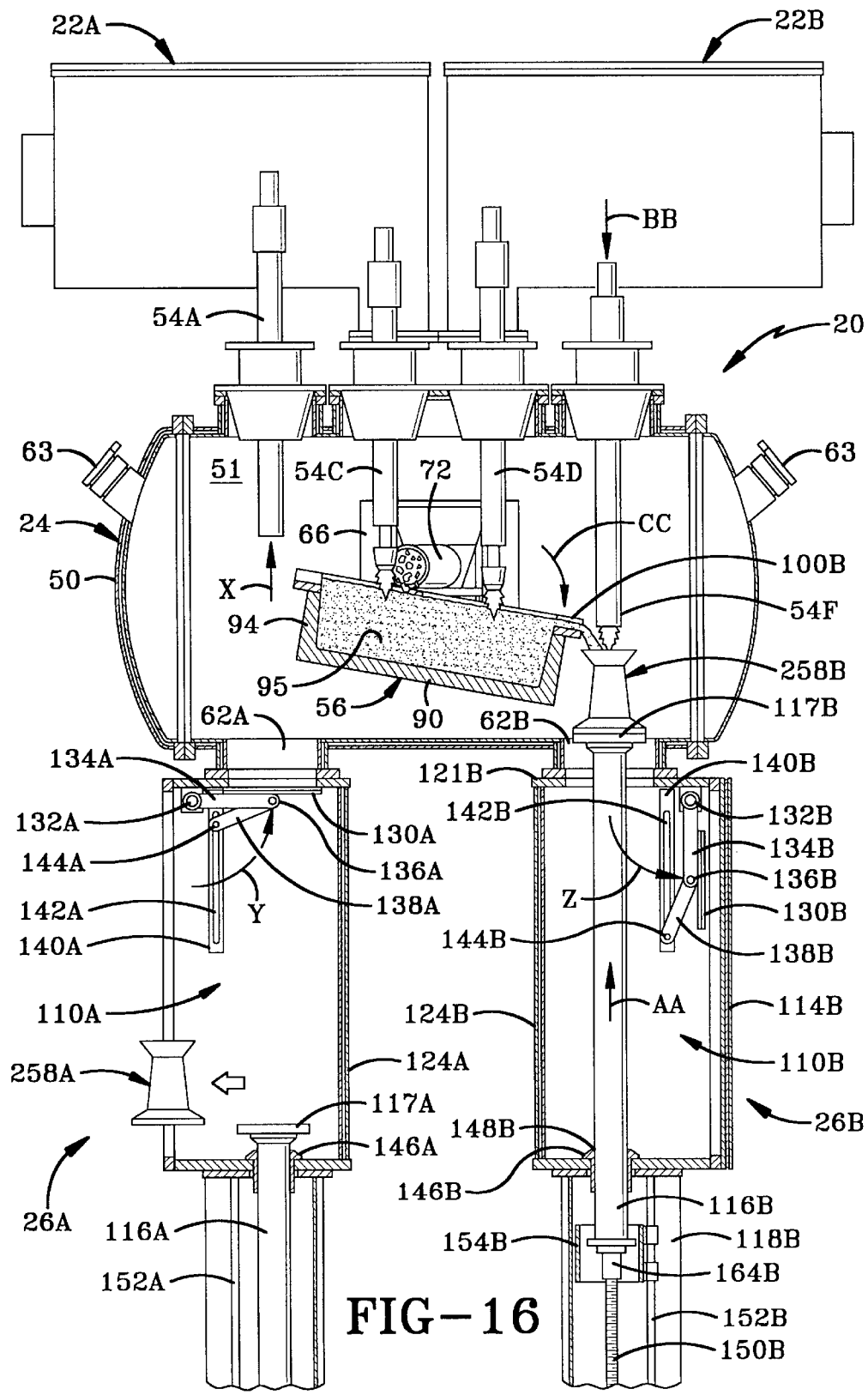
FIG. 16 is the same front elevational view as in FIG. 15 except that the torches are ignited and move to cause pouring from the hearth into the desired right side mold in this view and the corresponding right side flap is open and right side mold seating cylinder is inserted therethrough and positioned to allow for proper pouring into the mold, while simultaneously therewith the left side mold has been removed from the furnace and its corresponding left side flap is closed while the left side door is open to remove the left side mold.

A second embodiment is shown in FIGS. 15, 15A and 16. This embodiment is substantially identical to the first embodiment except instead of casting molds 58 as described above the embodiment includes direct molds 258A and 258B. These molds are designed to have the contours of a desired end product. The molds 258 sit directly on top of the cylinders. In addition, the hearth 56 tips to pour the molten material into the molds as is shown in FIG. 15. The hearth tips and fills the mold to the desired fill level, and then the hearth returns to its initial level position.

In the above-described embodiment, the heat sources were plasma torches. One other option for use in the first and second embodiments is direct arc electrodes for heat sources rather than plasma torches. In yet another and preferred embodiment such as is shown in the Figures for the second embodiment, heat sources 54A and 54F are plasma torches, while heat sources 54C and 54D are direct arc electrodes (DAE). In the preferred embodiment, the direct arc electrodes are non-consumable, rotating or fixed, direct arc electrodes.

In more detail, FIG. 15 shows heat sources 54A, 54C and 54D ignited causing flow to overflow 100A. The cylinder 116A is raised as shown by arrow V such that the direct mold 258A is properly positioned within the melting environment 51. The hearth is tipped to the left as shown by arrow W causing pouring into direct mold 258A. The other side is shown with the cylinder 116B retracted with mold 258B set thereon, and with the valve gate 130B closed.

FIG. 16 shows the system where torch 54A has been shut off and retracted as shown by arrow X, the cylinder 116A removed and fully retracted, valve gate 130A closed as shown by arrow Y, and direct mold 258A removed, while substantially simultaneously therewith valve gate 258B is opened as shown by arrow Z, cylinder 116B is fully extended (arrow AA) into the melting environment with direct mold 258B thereon, heat source 54F is lowered (arrow BB) into melt position and ignited, and hearth 56 is tilted as shown by arrow CC.

Figure 17:
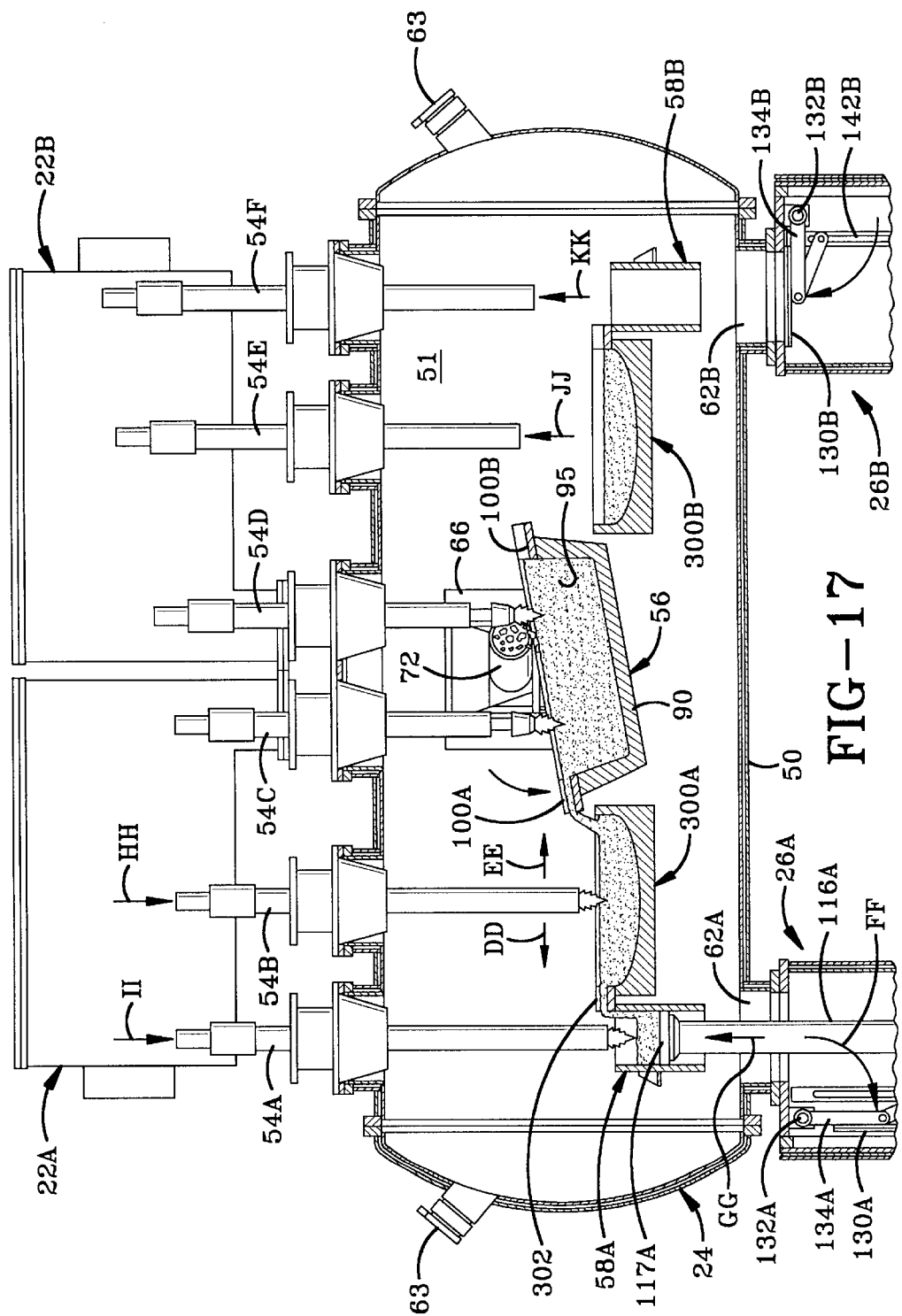
FIG. 17 is a front elevational view with covers removed and parts shown in section of a third embodiment of the cold hearth melting system of the present invention which is similar to the first embodiment except that the third embodiment includes refining hearths in between the melt hearth and the casting molds, where in FIG. 17 the main hearth torches are ignited and positioned to cause flow to the left side refining hearth and thereafter into the left side casting mold whereby the respective left side flap is open and the left side cylinder inserted within the furnace to properly position the casting mold and receive the new ingot.
Figure 18:
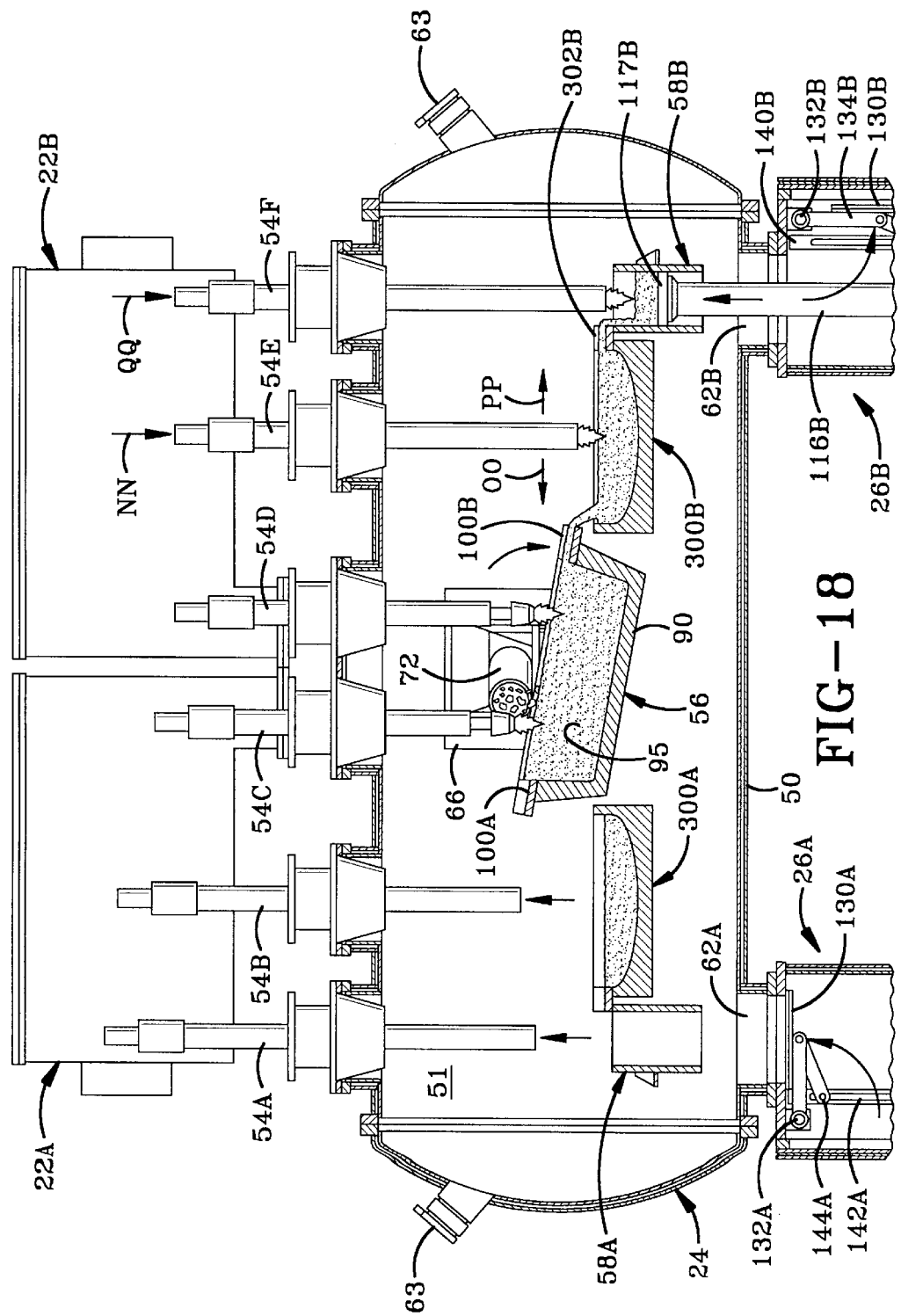
FIG. 18 is a front elevational view similar to FIG. 17 except that the main hearth torches are ignited and positioned to cause flow to the right side refining hearth and thereafter into the right side casting mold whereby the respective right side flap is open and the right side cylinder inserted within the furnace to properly position the casting mold and receive the new ingot while the left side flap is closed and the ingot formed on the left side has been removed.

A third embodiment is shown in FIGS. 17–18. This embodiment is substantially identical to the first and second embodiments where casting molds are used as in the first embodiment, both plasma torches and direct arc electrodes are used as in the second embodiment, tilting of the main hearth 56 occurs as in the second embodiment, and refining hearths 300A and 300B and corresponding heat sources 54B and 54E are added and may be either plasma torches or direct arc electrodes although are preferably direct arc electrodes.

In more detail, refining hearths 300A and 300B are added. These hearths may be of a similar construction to the main hearth 56, or alternatively may vary such as is shown where the refining hearths are shallower and have a more rounded interior. In addition, typically the refining hearths only have one overflow 302 as the molten material from the main hearth is poured into the refining hearth from overhead so it only needs to pour out of the opposite end via a well defined overflow into the molds.

The heat sources 54B and 54E may be either plasma torches or direct arc electrodes. In the embodiment shown, the heat sources are direct arc electrodes. The heat sources 54B and 54E move in a side to side linear fashion, specifically from end to end as shown by arrows DD and EE in FIG. 17 on torch 54B, although other motion is contemplated including circular pivoting.

In use, the system of the third embodiment operates as follows. When it is desirable to make elongated ingots this system is employed whereby heat sources 54C and 54D are lowered to proper positions above the hearth 56 as shown in FIG. 17 (and likely rotated as described above to better melt to titanium). Once the titanium is sufficiently molten, ingots may be created on either the left or right sides of the system. As shown in FIG. 17, valve gate 130A is opened by the motion shown by arrow FF and described above with reference to the other embodiments. Cylinder 116A is then actuated upward as shown by arrow GG from its fully retracted position to its fully extended position.

Heat source 54B is lowered as shown by arrow HH and ignited. The heat source will move side to side as shown by arrows DD and EE. Heat source 54A is lowered into position as shown by arrow 11 and ignited. Heat sources 54E and 54F are raised as shown by the arrows JJ and KK and are not ignited. Once the titanium and alloy in the hearth 56 are sufficiently heated to produce molten titanium, the ingot producing process may begin. The hearth 56 tips to allow flow out of overflow 100A into refining hearth 300A. The molten material is further refined as is well known in the art and either overflows out of overflow 302A where the refining hearth is stationary or is poured out of overflow 302A by tilting of the refining hearth. This flow pours molten titanium into casting mold 58A whereby the ingot forms therein between the cylinder head 117A and the mold casting interior. Cylinder 116A is slowly withdrawn as additional molten material is added and the ingot forms. The tipped hearths are returned to level. The valve gate 130A is closed, the heat sources 54A ad 54B are shut off and retracted.

While this ingot is removed, an ingot may be formed on the other side as is shown in FIG. 18. Since the titanium remains sufficiently molten in the main hearth, valve gate 130B is opened by the motion shown by arrow LL and described above with reference to the other embodiments. Cylinder 116B is then actuated upward as shown by arrow MM from its fully retracted position to its fully extended position.

Heat sources 54E is lowered as shown by arrow NN and ignited. The heat source 54E will move side to side as shown by arrows OO and PP. Heat source 54F is lowered into position as shown by arrow QQ and ignited. Heat sources 54A and 54B are not ignited, if they were not already raised and shut off. The hearth 56 tips to allow flow out of overflow 100B into refining hearth 300B. The molten material is further refined as is well known in the art and either overflows out of overflow 302B where the refining hearth is stationary or is poured out of overflow 302B by tilting of the refining hearth. This flow pours molten titanium into casting mold 58B whereby the ingot forms therein between the cylinder head 117B and the mold casting interior. Cylinder 116B is slowly withdrawn as additional molten material is added and the ingot forms.

This back and forth process from the left side to the right side continues as long as additional ingots are desired. The two ingot forming and lift systems allow for optimize use of the main hearth since removal of one ingot takes place while another is formed, and vice versa.

It is also contemplated that direct molds could be used with this third embodiment although not shown.

As noted above, in accordance with one of the features of the invention, a combination of plasma torches and direct arc electrodes are used as heat sources. This mixture combines the benefits of the systems, and offsets the detriments to provide the most advanced cold hearth melting. It is contemplated that direct arc electrodes and plasma torches may be used in any combination over the melting hearth, refining hearths and molds except that plasma torches are not preferred in the melting hearth as this often introduces the issue of plum winds blowing unmelted solids downstream into the refining hearth and/or molds.

Plasma cold hearth melting has certain strengths over electron beam cold hearth melting. These include: (1) less expensive equipment costs as plasma cold hearth melting does not require a "hard" vacuum, and the plasma torches are less expensive than electron beam guns or torches, (2) better chemistry consistency using a plasma torch because the operator has better control of the alloys and in particular those alloys containing aluminum as a result of the vacuum used in electron beam melting far exceeding the vapor pressure point of aluminum (resulting in evaporation of elemental aluminum results in potential alloy inconsistency and furnace interior sidewall contamination), (3) no risk of spontaneous combustion in plasma melting versus in electron beam melting where when the melt campaign is completed, and before the chamber door is opened, water is introduced into the chamber to help pacify the metal condensate with a controlled burn under vacuum to avoid the possibility of spontaneous combustion of the dust when the chamber is opened to atmosphere, (4) not exceeding the vapor pressure point of any element used in the manufacture of any known grade of titanium, (5) more accurate chemistry control because evaporation due to differing shaped and sized feed materials and differing residence times is of little concern, (6) produce a more active molten bath to more effectively mix various metallic constituents of differing densities and therefore produce better homogeneity in the bath prior to casting, and (7) relative simplicity of the energy source versus that of electron beam systems including far lower cost of repairing and maintaining plasma torches versus electron beam guns.

Electron beam melting has certain strengths over plasma cold hearth melting. These include: (1) very effective means of melting large volumes of commercially pure titanium very cost effectively, (2) better surface finish control as the electron beam is much narrower than a plasma plume and therefore the energy emitted can be controlled more accurately at the crucible wall to produce a better "as cast" surface finish alleviating some of the need to machine material from the surface of the cast product prior to further downstream processing and alleviating some concern associated with burning the copper crucible wall surface.

As a result, the current invention in its most preferred embodiment, combines the benefits of the plasma torches and electron beams by placing direct arc electrodes 54C and 54D in the main hearth with plasma torches 54A, 54B, 54E and 54F in the refining hearths and molds. In one example, the main hearth torches may be 600 kW direct arc electrodes or 900 kW plasma torches, and one or multiple may be used, while the refining torches are single 900 kW plasma torches, or multiple torches of the same or a different type. In general, low voltage and high current is desired.

In addition, the most preferred embodiment includes torches 54 that move in either a circular or rotational motion as shown by arrows A, G H and/or I, or a linear side to side motion as shown by arrows J, DD, EE, OO and PP. This allows more even and consistent melting and mixing prior to pouring out of the hearth. This also assists in preventing build-up in one place in the skull within the hearth.

Furthermore, the chute 72 (best shown in FIG. 5) is moveable in and out from a fully extended to a fully retracted position as well as from a rightmost position as shown in FIG. 7 for instance to a leftmost position as shown in FIG. 12 for instance, and including a center position as shown in FIG. 11 for instance. This allows for best placement of the raw material to allow the material sufficient time to properly melt and mix prior to pouring out of the hearth. This also assists in preventing build-up in one place in the skull within the hearth.

The invention thus provides and/or improves many advantages, and/or eliminates disadvantages, including but not limited to the following: (1) chemistry variations inherent in continuous melting, (2) surface finish problems, (3) unmelted machine turnings metallics contained in the product due to excessive plume winds in the melting vessel, (4) excessive Inert gas use, (5) active rather than passive inclusion removal, (6) greater general versatility (can be operated in a continuous or batch configuration), (7) homogeneous mixing, (8) restrictions on feed stock size and high feed stock preparation costs, (9) super heating, (10) heat management issues, (11) the inability to effectively cast near net shape, small diameter products effectively by traditional means, (12) controlled casting rates via hearth tilting and use of alternating refining hearths and/or molds, (13) continuous casting, and (14) stationary or tilting operations of hearth.

The system also allows for the re-use of turnings, particularly in the area of non-critical commercial grade alloy and cp titanium. The many new commercial uses such as golf club heads that are not critical components where failure is catastrophic (versus aircraft use where it is) increase the ability to use these turnings. In addition, the unique nature of this invention allows for turnings to be used whereby inclusions are prohibited, eliminated and/or reduced by the design.

Other uses are contemplated including providing for charging of the refining hearths and molds as well as the main hearth as described above. In certain applications, it is desirable to create a consolidated ingot or "cp" titanium that will later be re-melted in VAR furnaces, and thus speed rather than quality is paramount. By altering the above embodiment to provide chutes at each of, or at least some of, the refining hearths and molds, then material may be added at all steps so as to quickly make a consolidated ingot, most typically be a continuous process rather than a batch process using tilting.

The embodiments described above are described for titanium ingot manufacture. The system may also be used for noble metals and high alloy steel and nickel based alloys.

Accordingly, the improved cold hearth melting system of the above embodiments is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved system is constructed and used, the characteristics of the construction, and the advantageous, new and useful results obtained; the new and useful structures, devices, elements, arrangements, parts and combinations, are set forth in the appended claims.

What is claimed is:

1. An apparatus for optimal mixing of metal chips during melting, the apparatus comprising:
   a main hearth defining a melting cavity therein with first and second opposed overflows;
   a feed chute positioned to provide metal chips to the main hearth, the feed chute including an adjustable chute moveable to a plurality of positions over the main hearth for improved mixing of the metal chips in the melting cavity;
   first and second molds aligned respectively with the first and second overflows to be in fluid communication therewith; and
   at least one heat source overhead of the main hearth for selective heating of the contents of the main hearth.

2. The apparatus of claim 1 wherein, the feed chute is moveable laterally side to side.

3. The apparatus of claim 1 wherein the feed chute is extendable and retractable from an extended position where the adjustable chute is over the main hearth for pouring metal chips therein to a retracted position where the adjustable chute is at least substantially removed from the proximity of the main hearth.

4. The apparatus of claim 3 wherein the feed chute is moveable laterally side to side.

5. The apparatus of claim 4 wherein, the lateral side to side movement extends over substantially all of the main hearth.

6. The apparatus of claim 1 wherein the feed chute includes a hopper for storing metal chips whereby the adjustable hopper extends therefrom.

7. The apparatus of claim 1 wherein the feed chute includes a car moveable on rails, whereby the hopper is positioned on the car.

8. The apparatus of claim 1 wherein the feed chute is a vibratory feed chute.

9. A method for optimal mixing of metal chips during melting, the method comprising:
   moving an adjustable chute on a vibratory feed chute over a main hearth defining a melting cavity therein with first and second opposed overflows; and
   adjusting the adjustable chute in a lateral side to side direction for improved mixing of the metal chips in the melting cavity.

10. The method of claim 9 further comprising igniting at least one heat source overhead of the main hearth for selective heating of the contents of the main hearth.

11. The method of claim 10 wherein the adjusting of the adjustable chute is in the lateral direction opposite the overflow in the main hearth through which molten flow is occurring.

12. An apparatus for optimal mixing of metal chips during melting, the apparatus comprising:
    a main hearth defining a melting cavity therein with first and second opposed overflows;
    a first feed chute positioned to provide metal chips to the main hearth, the first feed chute including an adjustable chute moveable to a plurality of positions over the main hearth for improved mixing of the metal chips in the melting cavity;
    first and second molds aligned respectively with the first and second overflows to be in fluid communication therewith; each mold defining a melting cavity;
    at least one additional feed chute positioned to provide metal chips to at least one of the first and second molds, the additional feed chute including an adjustable chute moveable to a plurality of positions over the mold for improved mixing of the mold metal chips in the melting cavity; and
    at least one heat source overhead of the main hearth for selective heating of the contents of the main hearth.

13. The apparatus of claim 12 wherein the at least one additional feed chute comprises a pair of additional feed chutes to respectively provide metal chips to both of the molds, each of the additional feed chutes including an adjustable chute moveable to a plurality of positions over the respective mold for improved mixing of the metal chips in the respective mold melting cavity.

14. The apparatus of claim 13 wherein each of the feed chutes is moveable laterally side to side.

15. The apparatus of claim 14 wherein the lateral side to side movement extends respectively over substantially all of the main hearth or molds.

16. The apparatus of claim 15 wherein each of the feed chutes is a vibratory feed chute.

17. The apparatus of claim 12 further including first and second refining hearths each defining a melting cavity, the first refining hearth positioned in between the main hearth and the first mold and the second refining hearth positioned in between the main hearth and the second mold.

18. The apparatus of claim 17 further comprising an additional pair of additional feed chutes respectively to provide metal chips to both of the refining hearths, each of the refining hearth additional feed chutes including an adjustable chute moveable to a plurality of positions over the respectively refining hearths for improved mixing of the metal chips in the respective refining hearth melting cavity.

* * * * *